(12) United States Patent
Muralidhara et al.

(10) Patent No.: US 6,630,195 B1
(45) Date of Patent: Oct. 7, 2003

(54) PROCESS FOR PRODUCING OILSEED PROTEIN PRODUCTS

(75) Inventors: Harapanahalli S. Muralidhara, Plymouth, MN (US); Michael A. Porter, Maple Grove, MN (US); Jagannadh V. Satyavolu, Cedar Rapids, IA (US); William H. Sperber, Minnetonka, MN (US); Ian Purtle, Plymouth, MN (US)

(73) Assignee: Cargill, Incorporated, Wayzata, MN (US)

( * ) Notice: Subject to any disclaimer, the term of this patent is extended or adjusted under 35 U.S.C. 154(b) by 0 days.

(21) Appl. No.: 09/717,923

(22) Filed: Nov. 21, 2000

(51) Int. Cl.$^7$ .............................. A23L 1/20; A23L 1/28; A23J 1/14
(52) U.S. Cl. .................. 426/656; 426/634; 426/431; 426/655; 530/377; 530/378
(58) Field of Search ................................. 426/629, 656, 426/634, 431, 655; 530/377, 378

(56) References Cited

U.S. PATENT DOCUMENTS

| | | | |
|---|---|---|---|
| 3,586,662 A | 6/1971 | O'Connor | 260/123.5 |
| 3,622,556 A | 11/1971 | O'Connor | 260/123.5 |
| 3,728,327 A | 4/1973 | Frazeur et al. | 260/123.5 |
| 3,736,147 A | 5/1973 | Iacobucci et al. | 99/17 |
| 3,880,755 A | 4/1975 | Thomas et al. | 210/91 |
| 3,896,241 A | 7/1975 | Malaspina et al. | 426/271 |
| 3,958,015 A | 5/1976 | Gay | 426/18 |
| 3,993,636 A | 11/1976 | Maubois et al. | 260/123.5 |
| 3,995,071 A | 11/1976 | Goodnight, Jr. et al. | 426/598 |
| 4,018,752 A | 4/1977 | Bühler et al. | 260/112 R |
| 4,028,468 A | 6/1977 | Hohner et al. | 426/436 |
| 4,069,103 A | 1/1978 | Müller | 195/4 |
| 4,072,670 A | 2/1978 | Goodnight, Jr. et al. | 260/123.5 |
| 4,075,361 A | 2/1978 | Oberg | 426/655 |
| 4,088,795 A | 5/1978 | Goodnight, Jr. et al. | 426/598 |
| 4,091,120 A | 5/1978 | Goodnight, Jr. et al. | 426/598 |
| 4,125,527 A | 11/1978 | Buhler et al. | 260/112 R |
| 4,147,745 A | 4/1979 | Sano et al. | 264/22 |
| 4,163,010 A | 7/1979 | Garbutt | 260/112 R |
| 4,252,652 A | 2/1981 | Elfert et al. | 210/654 |
| 4,256,652 A | 3/1981 | Kidani et al. | 260/429 R |
| 4,293,571 A | 10/1981 | Olofsson et al. | 426/7 |

(List continued on next page.)

FOREIGN PATENT DOCUMENTS

| | | |
|---|---|---|
| GB | 1 540 376 | 2/1979 |
| GB | 1 580 051 | 11/1980 |
| WO | WO 98/12209 | 3/1998 |

OTHER PUBLICATIONS

International Search Report for PCT/US01/43304 dated Dec. 19, 2002 (2 pages).

S. K. Sayed Razavi, J. L. Harris, F. Sherkat, "Fouling and cleaning of membranes in the ultrafiltration of the aqueous extract of soy flour," *Journal Of Membrane Science*, 114 (1996), pp. 93–104.

Cheryan, "Mass Transfer Characteristics of Hollow Fiber Ultrafiltration of Soy Protein Systems," *J. Food Proc. Eng.*, *1*, pp. 269–287 (1977).

(List continued on next page.)

Primary Examiner—Anthony J. Weier
(74) Attorney, Agent, or Firm—Foley & Lardner

(57) ABSTRACT

A method for preparing the high protein product from oilseed-based material is described. The high protein product provided by the process can be utilized in a wide variety of applications, including the preparation of food products for human consumption. The high protein product typically includes at least 85 wt. % protein (dry solids basis). The product is produced by a process which includes purifying an aqueous protein-containing extract through passage over a microporous membrane. The membrane generally has an MWCO of at least 25,000 and a filtering surface with a contact angle of no more than 30 degrees.

25 Claims, 13 Drawing Sheets

U.S. PATENT DOCUMENTS

| | | | |
|---|---|---|---|
| 4,324,805 A | 4/1982 | Olsen | 426/46 |
| 4,332,719 A | 6/1982 | Lawhon et al. | 260/123.5 |
| 4,420,425 A | 12/1983 | Lawhon | 260/123.5 |
| 4,624,805 A | 11/1986 | Lawhon | 530/376 |
| 4,697,004 A | 9/1987 | Puski et al. | 530/378 |
| 4,787,976 A | 11/1988 | Parham et al. | 210/500.23 |
| 4,889,921 A | 12/1989 | Diosady et al. | 530/377 |
| 4,897,465 A | 1/1990 | Cordle et al. | 530/387 |
| 4,906,379 A | 3/1990 | Hodgins et al. | 210/638 |
| 4,943,373 A | 7/1990 | Onishi et al. | 210/500.42 |
| 4,943,374 A | 7/1990 | Heininger et al. | 210/651 |
| 5,000,848 A | 3/1991 | Hodgins et al. | 210/321.68 |
| 5,039,420 A | 8/1991 | Klein et al. | 210/645 |
| 5,086,166 A | 2/1992 | Lawhon et al. | 530/378 |
| 5,290,448 A | 3/1994 | Sluma et al. | 210/500.23 |
| 5,456,843 A | 10/1995 | Koenhen | 210/651 |
| 5,476,590 A | 12/1995 | Brose et al. | 210/636 |
| 5,503,746 A | 4/1996 | Gagnon | 210/490 |
| 5,554,292 A | 9/1996 | Maeda et al. | 210/640 |
| 5,658,714 A | 8/1997 | Westfall et al. | 530/378 |
| 5,707,522 A | 1/1998 | Maeda et al. | 210/500.23 |
| 5,760,182 A | 6/1998 | Adachi et al. | 530/378 |
| 5,939,182 A | 8/1999 | Huang et al. | 428/323 |
| 6,056,903 A | 5/2000 | Greenwood et al. | 264/41 |

OTHER PUBLICATIONS

Gould et al., "A Practical Approach to Controlling the Fouling of Ultrafiltration Membranes: A Case Study of the Successful Development of a Commercial Soy Protein Application," available @ http://www.osmonics.com/products/Page823.htm (available at least by Dec. 3, 1999).

Lawhon et al., "Processing Whey–Type By–Product Liquids from Cottonseed Protein Isolation with Ultrafiltration and Reverse Osmosis Membranes," *J. Food Proc. Eng., 1*, pp. 15–35 (1977).

Lawhon et al., "Production of Protein Isolates and Concentrates from Oilseed Flour Extracts using Industrial Ultrafiltration and Reverse Osmosis Systems," *Journal of Food Science, 42*, pp. 389–394 (1977).

Lawhon et al., "Optimization of Protein Isolate Production from Soy Flour Using Industrial Membrane Systems," *Journal of Food Science, 43*, pp. 361–369 (1978).

Lawhon et al., "Alternate Processes for Use in Soy Protein Isolation by Industrial Ultrafiltration Membranes," *Journal of Food Science, 44*, pp. 213–219 (1979).

Lawhon et al., "Soy Protein Ingreedients Prepared by New Processes–Aqueous Processing and Industrial Membrane Isolation," *Journal of the American Oil Chemists' Society, 58*, pp. 377–383 (Mar. 1981).

Lawhon et al., "Production of Oil and Protein Food Products from Raw Peanuts by Aqueous Extraction and Ultrafiltration," *Journal of Food Science, 46*, pp. 391–395 (1981).

Lawhon et al., "Combining Aqueous Extraction and Membrane Isolation Techniques to Recover Protein and Oil from Soybeans," *Journal of Food Science, 46*, pp. 912–916 (1981).

Lawhon et al., "New Techniques in Membrane Processing of Oilseeds," *Food Technology, 38*, pp. 97–106 (1984).

Nichols et al., "Production of Soy Isolates by Ultrafiltration: Factors Affecting Yield and Composition" *J. Food Sci., 46*, pp. 367–372 (1981).

Okubo et al., "Preparation of Low–Phytate Soybean Protein Isolate and Concentrate by Ultrafiltration," *Cereal Chemistry, 52*, pp. 263–271 (1975).

Omosaiye et al., "Removal of Oligosaccharides from Soybean Water Extracts by Ultrafiltration," *J. Food Sci., 43*, pp. 354–360 (1978).

Omosaiye et al., "Ultrafiltration of Soybean Water Extracts: Processing Characteristics and Yields," *J. Food Sci., 44*, pp. 1027–1031 (1979).

Omosaiye et al., "Low–Phytate, Full–Fat Soy Protein Product by Ultrafiltration of Aqueous Extracts of Whole Soybeans," *Cereal Chem., 56*, pp. 58–62 (1979).

Osmonics, "Osmonics® Ultrafilic ® M–Series Membrane Engineered to be 'Fouling–Free,'" available @ http://www.osmonics.com/scripts/PressTmpl.asp?PressRelID=307 (dated Oct. 4, 1999).

Osmonics, "UltraFilic Membranes," available @ http://www.osmonics.com/products/Page918.htm (available at least by Nov. 15, 2000).

Porter et al., "Membrane ultrafiltration," *Chem. Tech.*, pp. 56–63 (Jan. 1971).

Tarok, "The Filtration Spectrum," available @ http://www.osmonics.com/products/Page710.htm (Published in "Filtration News" on May 1, 1994).

United Soybean Board, "Soy Protein Isolate" available @ http://www.talksoy.com/isolate.htm (available at least by Sep. 6, 2000).

PROCESS FOR PRODUCING OILSEED PROTEIN PRODUCTS

BACKGROUND

Soy protein products are used as food additives for enhancing texture and other functional characteristics of various food products as well as a source of protein. The use of soy protein products may be limited in some instances, however, due to their beany flavor and tan-like color. It is still unclear exactly which components are responsible for the flavor and color characteristics of soybeans, though a variety of compounds are suspected of causing these characteristics. Among these are aliphatic carbonyls, phenolics, volatile fatty acids and amines, esters and alcohols.

Soybean protein in its native state is unpalatable and has impaired nutritional quality due to the presence of phytic acid complexes which interfere with mammalian mineral absorption, and the presence of antinutritional factors which interfere with protein digestion in mammals. There are extensive reports of processes used for the isolation, purification and improvement of the nutritional quality and flavor of soybean protein. The reported methods include the destruction of the trypsin inhibitors by heat treatment as well as methods for the removal of phytic acid. A wide variety of attempts to improve the yield of protein secured as purified isolate relative to that contained in the soybean raw material have also been described.

Many processes for improving soy protein flavor involve the application of heat, toasting, alcohol extraction and/or enzyme modification. These types of processes often result in substantial protein denaturation and modification, thereby substantially altering the product's functionality. In addition, these processes can promote interactions between proteins with lipid and carbohydrate constituents and their decomposition products. These types of reactions can reduce the utility of soy proteins in food products, especially in those that require highly soluble and functional proteins, as in dairy foods and beverages.

Commercial soy protein concentrates, which are defined as soy protein products having at least 70% by weight protein (dry solids basis), are generally produced by removing soluble sugars, ash and some minor constituents. The sugars are commonly removed by extracting with: (1) aqueous alcohol; (2) dilute aqueous acid; or (3) water, after first insolubilizing the protein with moist heating. These processes generally produce soy protein products with a distinctive taste and color.

Soy protein isolates are defined as products having at least 90% by weight protein (dry solids basis). Commercial processes for producing soy protein isolates are generally based on acid precipitation of protein. These methods of production typically include (1) extracting the protein from soy flakes with water at an alkaline pH and removing solids from the liquid extract; (2) subjecting the liquid extract to isoelectric precipitation by adjusting the pH of the liquid extract to the point of minimum protein solubility to obtain the maximum amount of protein precipitate; and (3) separating precipitated protein curd from by-product liquid whey. This type of process, however, still tends to produce a protein product with a distinctive taste and color.

A number of examples of processes for producing concentrated soy protein products using membrane filtration technology have been reported. Due to a number of factors including cost, efficiency and/or product characteristics, however, membrane-based purification approaches have never experienced widespread adoption as commercial processes.

One early method for obtaining soy protein relied on homogenization to obtain a fine dispersion which was subjected to centrifugal separation. The liquid extract obtained from this separation was then subjected to reverse osmosis to remove water and low molecular weight compounds. The retentate from the reverse osmosis was dried to produce the final product.

A number of processes which make use of ultrafiltration in producing soy or other protein products have also been reported. A typical process of this type involves extensive membrane filtration of a relatively dilute oilseed protein extract, followed by concentration and drying of the retentate. The nominal molecular weight cut-off of the ultrafiltration membranes employed in such processes is typically reported to be in the range of 10,000 to 100,000, with membranes having an MWCO in the lower half of this range generally described being preferred. For example, one process described for preparing a soy protein with reduced phytic acid content includes aqueous extraction of defatted soy flakes, basification of the extract to a pH in excess of 10.1 and the removal of resulting insolubles. The liquid phase is then neutralized and subjected to ultrafiltration to retain higher molecular weight protein while allowing the lower molecular weight compounds to pass, e.g., using a semipermeable membrane having a minimum molecular weight in the range of about 10,000–50,000 daltons. A number of other methods which involve membrane filtration of acidic or basic soy protein extracts have been described.

These and other related processes can suffer from one or more disadvantages, such as reduced functional characteristics in the resulting protein product and the production of a product which has an "off" flavor and/or an off-color such as a dark cream to light tan color. Membrane-based processes can also be difficult to operate under commercial production conditions due to problems associated with bacterial contamination of the membranes. Contamination can have undesirable consequences for the flavor of the product. In addition, deterioration of the membrane under repeated use can necessitate frequent replacement of membrane modules, greatly increasing process down time and raising process costs.

SUMMARY

A method of converting oilseed material, such as defatted soybean white flakes or soybean meal, into a high protein content material with desirable flavor and/or color characteristics is described herein. The modified oilseed material provided by the method is particularly suitable for use as a protein source for incorporation into foods for human and/or animal consumption.

The present process typically includes an extraction step to solubilize proteinaceous material present in an oilseed material. It may be desirable to conduct the extraction as a continuous, multi-stage countercurrent extraction step. If desired, a relatively low water-to-flake ratio can be employed in the extraction process, e.g., no more than about 10:1. This can help reduce the overall hydraulic loading required by the process and produce an oilseed extract that is more concentrated (i.e., has a higher dissolved solids content) than extracts typically produced in conventional processes used to produce oilseed protein concentrates.

The process uses one or more microporous membranes to separate and concentrate protein from the extract. It is generally advantageous to use a microporous membrane which has a filter surface with a relatively low contact angle, e.g., no more than about 40 degrees. The process commonly utilizes either relatively large pore ultrafiltration membranes (e.g., membranes with a molecular weight cut-off ("MWCO") of about 25,000 to 500,000) or microfiltration membranes with pore sizes up to about 1.5μ. When microfiltration membranes are employed, those with pore sizes of no more than about 1.0μ and, more desirably, no more than about 0.5μ are particularly suitable. Herein, the term "microporous membrane" is used to refer to ultrafiltration membranes and microfiltration membranes collectively. By employing such relatively large pore microporous membranes, the membrane filtration operation in the present process can be carried out using transmembrane pressures of less than about 100 psig, desirably less than about 50 psig, and more commonly in the range of 10–20 psig.

In most instances, the permeate stream produced by the membrane filtration has essentially no suspended solids. This allows the soluble carbohydrates in the permeate stream to be separated from the water in this stream via reverse osmosis, if desired. The water passing through the reverse osmosis membrane(s) ("RO permeate") can be recycled back into an earlier stage in the process, e.g., in the extraction or for use as a diluent in a diafiltration operation.

The retentate stream produced by the membrane filtration typically has a relatively high protein content (on a dissolved solids basis—"dsb"). For example, the present process can be used to produce oilseed protein products which have at least about 70 wt. % protein (dsb) and, preferably, at least about 90 wt. % protein (dsb). The concentrated soy protein material can be used directly in the form produced by the membrane filtration or may be further processed. For example, the retentate stream is commonly dried to produce a dry particle product, e.g., by spray drying the retentate stream using conventional equipment. When this is done the pH of the retentate stream is typically adjusted to a pH close to neutral (e.g., about 6.8–7.0), prior to spray drying. Depending on the type of product desired, the pH adjusted retentate may also be subjected to treatment at a relatively high temperature for a short time ("HTST") in order to pasteurize the retentate. Since the HTST step is very effective in killing bacteria, even thermophiles, this operation can be used to substantially reduce the total plate counts of bacteria in the final soy protein product. Depending on the temperature and duration of the treatment, it can also be utilized to alter the functional properties of the soy protein product.

DETAILED DESCRIPTION

Figure 1:
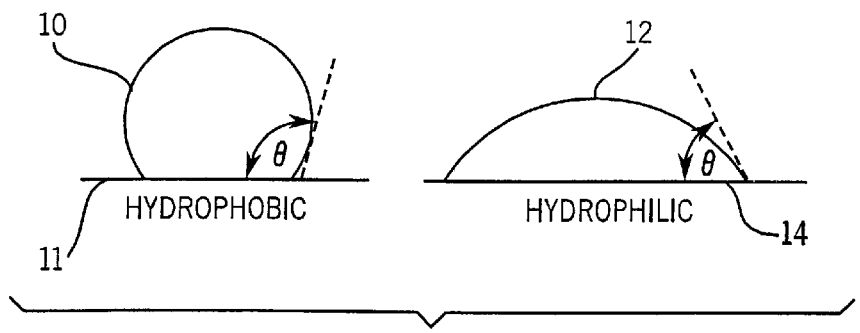
FIG. 1 depicts the contact angles ("theta") for water drops on hydrophilic and hydrophobic surfaces.

The modified oilseed material provided by the method generally has a high protein content as well being light colored and having desirable flavor characteristics. The modified oilseed material can have a variety of other characteristics that make it suitable for use as a protein source for incorporation into foods for human and/or animal consumption.

Soy protein has been shown to consist of at least four major fractions. The approximate amounts and molecular weights of each of these fractions, as determined by ultracentrifugation, are set forth in Table 1 (data taken from Wolf et al., *Arch. Biochem. Biophys.*, 99, 265 (1962)). The various fractions have been classified based on sedimentation coefficients. From an efficiency standpoint, processes for producing oilseed protein products typically seek to maximize the amount of protein recovered. Soybean protein in its native state has impaired nutritional quality due to the presence of phytic acid complexes and antinutritional factors, such as trypsin inhibitors. Thus, for processes which do not include a step designed to inactivate the antinutritional factors, e.g., via heat treatment, removal of these factors may be more important than completely maximizing the overall protein yield. Since the antinutritional factors tend to be found among the lower molecular weight fractions of the native soy protein (see Table 1), it is possible to remove these factors without greatly decreasing the overall protein yield.

TABLE 1

Soy Protein Fractions

| Fraction | Wt. % | Component | Molecular Weight |
|---|---|---|---|
| 2S | 22 | Trypsin inhibitors | 3,000–21,500 |
|  |  | Cytochrome c | 12,000 |
| 7S | 37 | Hemagglutinins | 110,000 |
|  |  | Lipoxygenases | 102,000 |
|  |  | B-Amylase | 61,700 |
|  |  | 7S Globulin | 180,000–210,000 |
| 11S | 31 | 11S Globulin | 350,000 |
| 15S | 11 | — | 600,000 |

The present process typically includes an extraction step to solubilize proteinaceous material present in an oilseed material and a subsequent purification of the extract using one or more microporous membranes to remove carbohydrates, salts and other non-protein components. Very often, the extract is clarified prior to membrane purification by at least removing a substantial amount of the particulate material present in the suspension produced by the extraction procedure.

The process described herein uses one or more microporous membranes to separate and concentrate protein from an oilseed extract. It is generally advantageous to use a microporous membrane which has a filter surface with a relatively low contact angle, e.g., no more than about 40 degrees. Microporous membranes with even lower contact angles, e.g., with filter surfaces having a contact angle of no more than about 30 degrees and in some instances of no more than about 15 degrees, are particularly suitable for use in the present method. The process commonly utilizes either relatively large pore ultrafiltration membranes (e.g., membranes with a molecular weight cut-off ("MWCO") of at least 30,000) or microfiltration membranes with pore sizes up to about $2\mu$.

Source of Oilseed Material

The starting material employed in the present method generally includes material derived from defatted oilseed material, although other forms of oilseed based material may be employed. The fat may be substantially removed from dehusked oilseeds by a number of different methods, e.g., by simply pressing the dehusked seeds or by extracting the dehusked seeds with an organic solvent, such as hexane. The defatted oilseed material which is employed in preferred embodiments of the present process typically contains no more than about 3 wt. % and, preferably, no more than about 1 wt. % fat. The solvent extraction process is typically conducted on dehusked oilseeds that have been flattened into flakes. The product of such an extraction is referred to as an oilseed "white flake." For example, soybean white flake is generally obtained by pressing dehusked soybeans into a flat flake and removing a substantial portion of the residual oil content from the flakes by extraction with hexane. The residual solvent can be removed from the resulting "white flake" by a number of methods. In one procedure, the solvent is extracted by passing the oilseed white flake through a chamber containing hot solvent vapor. Residual hexane can then be removed from soybean white flakes by passage through a chamber containing hexane vapor at a temperature of at least about 75° C. Under such conditions, the bulk of the residual hexane is volatilized from the flakes and can subsequently be removed, e.g., via vacuum. The material produced by this procedure is referred to as flash desolventized oilseed white flake. The flash desolventized oilseed white flake is then typically ground to produce a granular material. If desired, however, the flash desolventized oilseed white flake may be used directly in the present method.

Another defatted oilseed derived material which is suitable for use in the present process is derived from material obtained by removing the hexane from the oilseed white flake by a process referred to as "toasting." In this process, the hexane extracted oilseed white flakes are passed through a chamber containing steam at a temperature of at least about 105° C. This causes the solvent in the flakes to volatilize and be carried away with the steam. The resulting product is referred to as toasted oilseed flake. As with flash desolventized oilseed white flake, toasted oilseed flake may be used directly in the present method or may be ground into a granular material prior to extraction.

While the desolventized oilseed white flake may be used directly in the extraction step, more commonly the desolventized flake is ground to a granular material prior to being employed as starting material for the extraction. Oilseed materials of this type, such as soybean meal, are used in a wide variety of other applications and are readily available from commercial sources. Other examples of oilseed materials which are suitable for use in the extraction include canola meal, sunflower meal, cottonseed meal, peanut meal, lupin meal and mixtures thereof. Oilseed materials derived from defatted soybean and/or defatted cottonseed are particularly suitable for use in the present method since such materials have a relatively high protein content.

Extraction of Oilseed Material

The extraction of the protein fraction from oilseed material can be carried out under a variety of conditions using conventional equipment. Among the factors which affect the choice of process parameters and equipment are the efficiency of the extraction, effects on the quality of the protein in the extract and minimization of the environmental impact of the process. For cost and environmental reasons, one often would like to reduce the volume of water used in the process. The process parameters are also generally selected so as to minimize the degradation of protein, e.g., via indigenous enzymes and/or chemical reactions, as well as to avoid substantial bacterial contamination of the extract.

A variety of reactor configurations including stirred tank reactors, fluidized bed reactors, packed bed reactors may be employed in the extraction step. For example, the entire extraction reaction may be performed in a single vessel having appropriate mechanisms to control the temperature and mixing of the medium. Alternatively, the extraction may be carried out in multiple stages performed in separate reaction vessels (see, e.g., the process system illustrated in FIG. 5).

As is common with many processes, the optimization of the various objectives typically requires a balancing in the choice of process parameters. For example, in order to avoid substantial chemical degradation of the protein, the extraction may be run at a relatively low temperature, e.g., about 15 to 40° C. and preferably about 20° C. to 35° C. Such temperatures, however, can be quite conducive to bacterial growth so that it may be best to minimize extraction times and/or conduct subsequent process operations at higher temperatures to reduce bacterial growth.

Alternately, the extraction may be run at slightly higher temperatures, e.g., 50 to 60° C., to reduce the chances of bacterial contamination. While this can reduce bacterial growth, the increased temperature can exacerbate potential problems due to chemical degradation of proteinaceous material. Thus, as for the extraction run at closer to room temperature, when the extraction is carried out at 50 to 60° C., it is generally best to complete the extraction as rapidly as possible in order minimize degradation of protein. When the extraction is run at temperatures between about 20 and 60° C., it has generally found that extraction times of one to two hours are sufficient to allow high recoveries of protein while avoiding significant protein degradation and/or bacterial contamination. Use of higher temperatures is generally avoided since substantial exposure to temperatures of 60° C. and above can lead to protein solutions which have a tendency to gel during processing.

Although oilseed materials have been extracted under both acidic and basic conditions to obtain their proteinaceous material, the present method typically includes an extraction under basic conditions, e.g., using an alkaline solution having a pH of about 7.5 to about 10. Very often, the extraction is conducted by contacting the oilseed material with an aqueous solution containing a set amount of base, such as sodium hydroxide, potassium hydroxide, ammonium hydroxide and/or calcium hydroxide, and allowing the pH to slowly decrease as the base is neutralized by substances extracted out of the solid oilseed material. The initial amount of base is typically chosen so that at the end of the extraction operation the extract has a desired pH value, e.g., a pH within the range of 7.0 to 9.5. Alternately, the pH of the aqueous phase can be monitored (continuously or at periodic time intervals) during the extraction and base can be added as needed to maintain the pH at a desired value. Extractions conducted in this manner at a pH in the range of 7.0 to 8.5 are particularly suitable.

When the extraction is carried out as a single stage operation, the spent oilseed material is generally washed at least once with water or alkaline solution to recover proteinaceous material which may have been entrained in the solids fraction. The washings may either be combined with the main extract for further processing or may be used in the extraction of a subsequent batch of oilseed material.

The extraction operation commonly produces a mixture of insoluble material in an aqueous phase which includes soluble proteinaceous material. The extract may be subjected directly to separation via membrane filtration. In most cases, however, the extract is first clarified by removing at least a portion of the particulate matter from the mixture to form a clarified extract. Commonly, the clarification operation removes a significant portion and, preferably, substantially all of the particulate material. Clarification of the extract can enhance the efficiency of the subsequent membrane filtration operation and help avoid fouling problems with the membranes used in that operation.

The clarification can be carried out via filtration and/or a related process (e.g., centrifugation) commonly employed to remove particulate materials from the aqueous suspensions. Such processes do not, however, generally remove much of the soluble materials and thus the solubilized protein remains in the aqueous phase for further purification via membrane filtration. Because of the desire to achieve a high overall protein yield, the clarification step typically does not make use of filtration aids such as flocculants which could adsorb soluble proteinaceous material.

Figure 5:
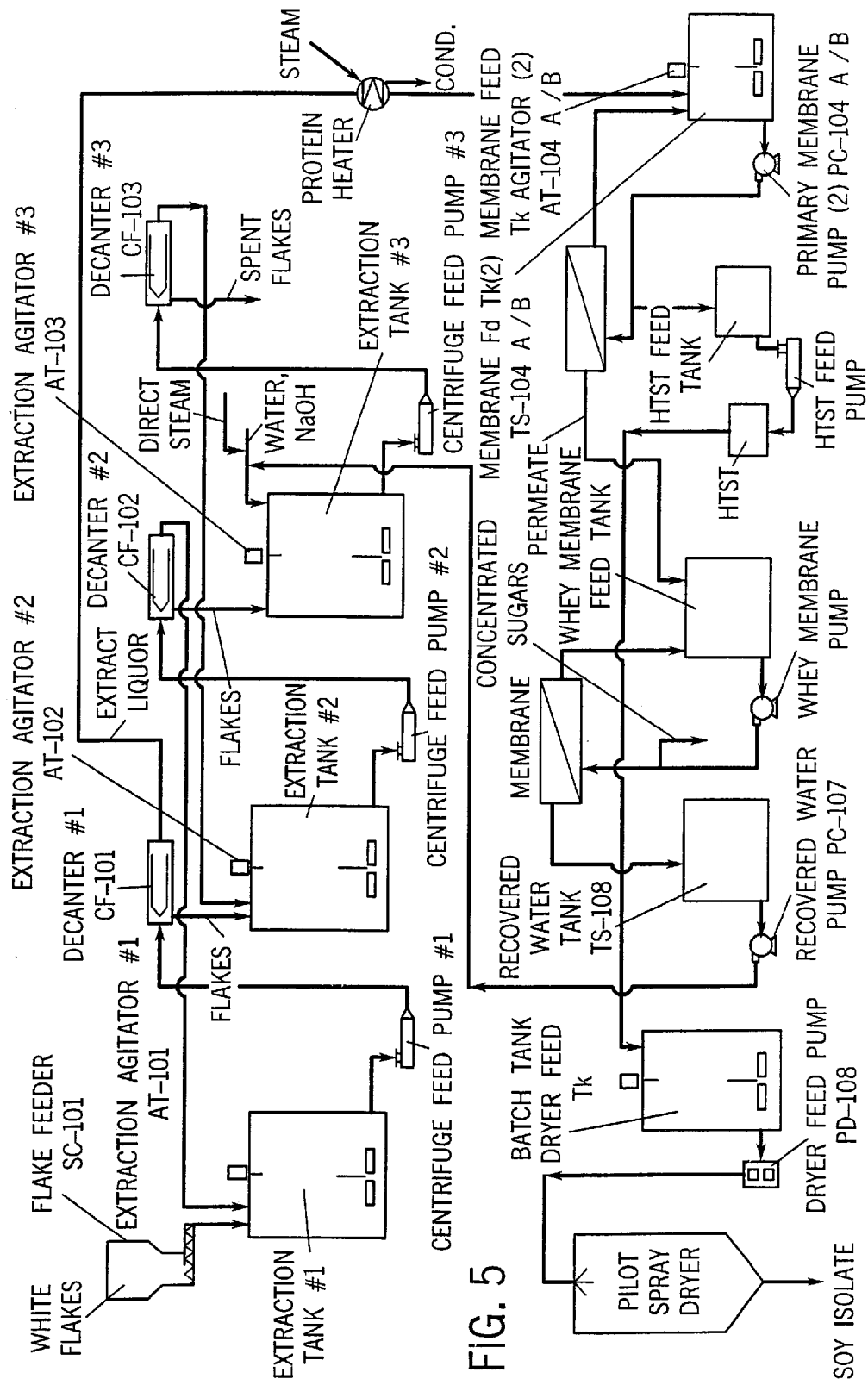
FIG. 5 shows a schematic of one example of a system which may be used to produce a modified oilseed material according to the present method.

As depicted in FIG. 5, one suitable method of conducting the extraction and clarification operations employs a series of extraction tanks and decanter centrifuges to carry out a multi-stage counter current extraction process. This type of system permits highly efficient extractions to be carried out with a relatively low water to flake ratio. For example, this type of system can efficiently carry out extractions where the weight ratio of the aqueous extraction solution to the oilseed material in each phase is in the range of 6:1 to 10:1. Use of low water to flake ratios can enable the production of an oilseed extract which contains a relatively high concentration of dissolved solids, e.g., dissolved solids concentrations of 5 wt. % or higher and the production of extracts with at least about 7 wt. % solids is not uncommon. The use of low water to flake ratios and more concentrated extracts allows the process to be run in a system with lower volume capacity requirements, thereby decreasing demands on capital costs associated with the system.

If the system requirements in a particular instance do not include significant restrictions on overall volume, the extraction process may be carried using higher water to flake ratios. Where relatively high water to flake ratios are employed in the extraction operation, e.g., ratios of 20:1 to 40:1, it may be more convenient to carry out the extraction in a single stage. While these types of water to flake ratios will require systems capable of handling larger volumes of fluids (per pound of starting oilseed material), the higher dilution factor in the protein extraction can decrease the potential for fouling the microporous membrane(s) used in the membrane filtration operation.

Membrane Filtration

Extract liquor is transferred from the extraction system to a membrane separation system, generally by first introducing clarified extract into a membrane feed tank. The extract liquor commonly contains about 4.0–5.0% soluble protein and about 1.5–2.0% dissolved non-protein material. One purpose of the microfiltration operation is to separate protein from non-protein material. This can be accomplished by circulating the extract liquor through a set of microfiltration membranes. Water and the non-protein materials pass through the membrane as permeate while most of the protein is retained in the circulating stream ("retentate"). The protein-containing retentate is typically allowed to concentrate by about a 2.5–3× factor (e.g., concentration of 30 gallons of incoming crude extract by a 3× factor produces 10 gallons of retentate). The concentration factor can be conveniently monitored by measure the volume of permeate passing through the membranes. Membrane concentration of the extract by a 3× factor generally produces a retentate stream with dissolved solids containing at least about 80 wt.

% protein (dsb). In order to increase the protein concentration to 90 wt. %, two 1:1 diafiltrations are typically carried out. In a diafiltration operation, water is added to the concentrated retentate and then removed through the microporous membranes. This can be carried out in the manner described above or, in an alternate embodiment of the present method, the diafiltration can be carried out at the initial stage of the membrane filtration, e.g., by continuously adding water to the incoming extract in a feed tank so as to substantially maintain the original volume.

The membrane filtration operation typically produces a retentate which is concentrated by at least a 2.5× factor, i.e., passing a volume of the extract through the filtration system produces a protein-enriched retentate having a volume of no more than 40% of the original extract volume. The output from the membrane filtration operation generally provides a protein-enriched retentate which includes at least 10 wt. % protein, and protein concentrations of 12 to 14 wt. % are readily attained.

For environmental and efficiency reasons, it is generally desirable to recover as much of the water from the membrane permeates as possible and recycle the recovered water back into the process. This decreases the overall hydraulic demand of the process as well as minimizing the volume of effluent discharged by the process. Typically, the diafiltration permeate is combined with the permeate from the concentration phase of the membrane filtration. The bulk of the water in the combined permeate can be recovered by separating the combined permeate with a reverse osmosis ("RO") membrane into an RO retentate and an RO permeate. RO separation can produce a permeate that is essentially pure water. This can be recycled back into earlier stages of the process. For example, the RO permeate can be used in an aqueous solution for extracting the oilseed material. The RO permeate can also be utilized in a diafiltration operation by diluting protein-enriched retentate with an aqueous diluent which includes the RO permeate.

The present process uses a membrane filtration system with one or more microporous membranes to separate and concentrate protein from the extract. It is generally advantageous to use a microporous membrane which has a filter surface with a relatively low contact angle, e.g., no more than about 40 degrees, as such membranes can provide efficient separation while exhibiting good resistance to fouling. Microporous membranes with even lower filter surface contact angles (i.e., surfaces having greater hydrophilicity) are particularly suitable for use in the present process. Such membranes may have a filter surface with a contact angle of 25 degrees or less and some membranes may have a filter surface contact angle of no more than 10 degrees.

The membranes should be capable of retaining a high percentage of the medium and high molecular weight protein components present in the extract while allowing water and other components to pass through the membrane. The membrane filtration operation commonly utilizes either relatively large pore ultrafiltration membranes (e.g., membranes with a molecular weight cut-off ("MWCO") of at least 30,000) or microfiltration membranes with pore sizes up to about 1.5$\mu$. Low contact angle microfiltration membranes with MWCOs of 25,000 to 200,000 are particularly suitable for use in the present process. Particular examples of suitable microporous membranes in modified PAN membranes with a filter surface contact angle of no more than 25 degrees and an MWCO of 30,000 to 100,000. To be useful in commercial versions of the process, the membranes should be capable of maintaining substantial permeation rates, e.g., allowing roughly 1500 to 3000 mL/min to pass through a membrane module containing circa 12 sq. meters of membrane surface area. By employing such relatively large pore microporous membranes, the membrane filtration operation can generally be carried out using membrane back pressures of no more than 100 psig. More preferably the membrane back pressure is no more than about 50 psig and efficient membrane separation has been achieved with back pressures in the range of 10–20 psig.

The membrane filtration system is generally configured to run in a cross-flow filtration mode. Because larger particles and debris are typically removed by the earlier clarification operation, the microporous membrane tends not to become clogged easily. Inclusion of the clarification step upstream in the process tends to result in longer membrane life and higher flux rates through the membrane. The membrane filtration system typically employs one or more interchangeable membrane modules. This allows membrane pore size (or MWCO) and/or membrane type to be altered as needed and allows easy replacement of fouled membranes.

Cross-flow filtrations can be run either continuously or in batch mode. Cross-flow membrane filtration can be run in a variety of flow configurations. For example, a tubular configuration, in which the membranes are arranged longitudinally in tubes similar to the tubes in a shell and tube heat exchanger, is one common configuration since it allows processing of solutions which include a variety of particle sizes. A number of other conventional cross-flow configurations, e.g., flat sheet and spiral wound, are known to provide effective membrane separations while reducing fouling of the membrane. Spiral wound cross-flow membrane systems are particularly suitable for use in the present processes, especially where the feed solution contains relatively little particulate matter, such as a clarified oilseed extract. Spiral wound membrane modules tend to provide highly efficient separations and permit the design of filtration systems with large membrane surface areas in a relatively compact space.

As with the extraction operation, the temperature of the protein-containing solution during the membrane filtration operation can affect the chemical state of the protein (e.g., via degradation and/or denaturation) as well as the amount of bacterial contamination which occurs. Lower temperatures tend to minimize chemical degradation of the protein. However, at lower temperatures bacterial growth can be a problem and the viscosity of more concentrated protein solutions (e.g., solutions with greater than 10 wt. % protein) can present processing problems. The present inventors have found that maintaining the protein-containing extract at about 55 to 60° C. while conducting the membrane separation can effectively suppress bacterial growth while minimizing changes in protein functionality due to chemical degradation/denaturation. It appears that any substantial exposure to higher temperatures can cause changes in the protein which can make concentrated solutions more prone to gelling, e.g., during a subsequent spray drying operation.

When the membrane filtration is run as a batch operation, the membranes are generally cleaned in between each run. Typically the membrane system will have been cleaned and sanitized the day before a run and the membranes will be stored in a sodium hypochlorite solution. Before use, the membrane system the hypochlorite solution is then drained out of the membrane system and the entire system is rinsed with water. When the membrane separation is carried out as a continuous operation, the membranes are commonly shut down at periodic intervals and cleaned in a similar fashion.

A variety of methods are known for cleaning and sanitizing microporous membrane systems during ongoing use.

One suitable cleaning procedure includes sequentially flushing the membrane with a series of basic, acidic and sanitizing solutions. Examples of suitable sanitizing solutions include sodium hypochlorite solutions, peroxide solutions, peracid solutions and surfactant-based aqueous sanitizing solution. Typically, the membrane is rinsed with water between treatments with the various cleaning solutions. For example, it has been found that membranes with a low contact angle filtering surface (e.g., modified PAN microporous membranes) can be effectively cleaned by being flushed with the following sequence of solutions:

1) Water;
2) Caustic solution (e.g., 0.2 wt. % NaOH solution);
3) Water;
4) Mild acid solution (e.g., aqueous solution with a pH 5.5–6);
5) Surfactant-based aqueous sanitizing solution (Ultra-Clean™; available from Ecolab, St. Paul, Minn.); and
6) Water.

The cleaning sequence is commonly carried out using room temperature solutions. If the membrane is significantly fouled, it may be necessary to carry out one or more of the rinsing steps at an elevated temperature, e.g., by conducting the caustic, acidic and/or sanitizing rinse at a temperature of about 40 to 50° C. In some instances, the effectiveness of the cleaning sequence can be enhanced by using a more strongly acidic rinse, e.g., by rinsing the membrane with a acidic solution having a pH of about 4 to 5. Other types of solutions can be used as a sanitizing solution. For example, if the membrane is sufficiently chemically inert, an oxidizing solution (e.g., a dilute solution of NaOCl or a dilute hydrogen peroxide solution) can be used as a sanitizing agent. After the final water rinse in the cleaning sequence, the membrane can be used immediately to effect the membrane separation of the present process. Alternatively, the membrane can be stored after cleaning. It is common to store the cleaned membrane in contact with a dilute bleach solution and then rinse the membrane again with water just prior to use.

By selecting a membrane which can be effectively cleaned (e.g., a membrane with low contact angle filtering surface such as a modified PAN membrane) it is possible to carry out membrane filtration of concentrated oilseed protein extracts which produce retentates having relatively low bacterial levels. For example, by employing a modified PAN membrane and a cleaning procedure similar to that outlined above, it is possible to produce spray dried protein concentrates having a total bacterial plate count of no more than 300,000 cfu/g and, desirably, no more than 50,000 cfu/g without subjecting the retentate to pasteurization (e.g., via HTST treatment).

Membrane Construction

The surface of a polymer matrix has voids formed by imperfections in the outer perimeter of the matrix and micropores formed by the molecular structure of the matrix. The term "surface" is intended to include the polymers or portions thereof which define these voids and micropores. If the matrix is in the form of a porous article, "surface" is also intended to include the polymers or portions thereof which define the pores of the article. The microporous membranes employed in the present method can have an asymmetric pore structure. That is, the size and structure of the pores are not the same throughout the entire membrane. As employed herein, the term asymmetric microporous membrane refers to membranes which have relatively larger pores in the filtering surface, i.e., the surface which comes into contact with the feed solution. The size of the pores decreases across the width of the membrane. The side of the membrane opposite the filtering surface generally has a very thin, relatively dense layer with the smallest sized pores. The transport properties of the membrane are generally primarily determined by the number and size of pores in this thin "skin" layer.

The hydrophilicity of a solid surface relates to the surface's affinity toward aqueous solutions. Hydrophilicity is also related to a membrane's biocompatability, i.e., its ability to be used effectively with proteins and similar substances without encountering significant fouling problems. Although hydrophilicity is not quantitatively defined in the industry, it can be qualitatively measured by determining the degree to which water spreads over the solid surface or by the angle of contact between the liquid surface and the solid surface when a drop of water rests on the solid surface. The more hydrophilic a surface is, the lower contact angle will be. FIG. 1 illustrates that a drop of water 10 has a greater contact angle (theta) when the water is on relatively hydrophobic surface 11 than when the water drop 12 is on relatively hydrophilic surface 14, that is, a large contact angle signifies a relatively hydrophobic surface and a small contact angle signifies a relatively hydrophilic surface.

As used herein, the term "contact angle" refers to contact angles of surfaces measured using the Sessile Drop Method. This is an optical contact angle method used to estimate the wetting property of a localized region on a surface. The angle between the baseline of a drop of water (applied to a flat membrane surface using a syringe) and the tangent at the drop boundary is measured. An example of a suitable instrument for measuring contact angles is a model DSA 10 Drop Shape Analysis System commercially available from Kruss.

The present method generally employs microporous membranes which have a relatively hydrophilic filtering surface, e.g., microporous membranes with a filtering surface having a contact angle of no more than 40 degrees. Preferably, the microporous membrane has a filtering surface with a contact angle of no more than 30 degrees and, more preferably no more than 15 degrees. Very often only the filtering surface of the membrane contains hydrophilic groups, such as N-alkylolamide groups, and the bulk of the polymer matrix which forms the membrane is hydrophobic polymer, thereby providing fouling resistance to the surface while maintaining the physical strength of the membrane.

The surfaces of the membrane used in the present process typically include functional groups which are hydrophilic, that is showing an affinity to water. The membranes are commonly formed from molecules of a suitable polymer having pendent groups which provide on the surface of the matrix sufficient uncharged, hydrophilic polar groups to render the surface hydrophilic. These groups may be obtained by derivatization of the pendent groups of the polymer or the groups may be "prefabricated" and then deposited or grafted directly onto the polymer at the surface of the matrix. It is likewise possible that one can deposit hydrophobic pendent groups on the surface of the matrix and then derivatize all or a portion of the groups to appropriate groups to render the surface hydrophilic. Similarly, monomers containing appropriate pendent groups may be deposited or grafted onto the surface of the matrix. Examples of membranes with relatively hydrophilic surfaces are described in U.S. Pat. No. 4,147,745, U.S. Pat. No. 4,943,374, U.S. Pat. No. 5,000,848, U.S. Pat. No. 5,503,746, U.S. Pat. No. 5,456,843, and U.S. Pat. No. 5,939,182, the disclosures of which are herein incorporated by reference.

The polymer matrix which makes up the membrane may include molecules of essentially any polymer containing the appropriate pendent groups. Suitable polymers include polymers which contain pendent groups which can be derivatized to substituted amide groups, such as polymers containing pendent nitrile groups. Suitable substituted amide groups are groups which are hydrophilic, that is showing an affinity to water. Examples include N-alkylolamide groups. The membranes employed in the present process preferably include molecules of a suitable polymer on the surfaces of the membrane that provide sufficient uncharged substituted amide groups (e.g., hydroxyalkyl substituted amide groups such as hydroxymethyl substituted amide groups) to render the membrane surfaces hydrophilic.

The membranes may be formed from a nitrile-containing polymer which includes substituted amide groups. The substituted amide groups are preferably uncharged at neutral or near-neutral pH's. The substituted amide groups may be derived from the nitrile groups. Examples of such polymers include modified polyacrylonitrile polymers. As used herein, the term "polyacrylonitrile polymer" refers to polymers formed from monomer mixtures in which at least 50 mole % of the monomers are acrylonitrile-type monomers, preferably acrylonitrile and/or methacrylonitrile. More typically, at least 90 mole % of the monomers are acrylonitrile and/or methacrylonitrile.

Merely by way of example, suitable polymers include nitrile-containing polymers, such as homo- and copolymers formed from acrylonitrile-type monomers, cyanostyrene monomers (e.g., cinnamonitrile), unconjugated alkenenitrile monomers, and/or cyanoalkyl (meth)acrylic ester monomers. Particularly suitable monomers include acrylonitrile-type monomers, such as acrylonitrile, methacrylonitrile, other 2-alkenenitrile monomers (typically containing no more than 6 carbon atoms), chloroacrylonitrile, and fluoroacrylonitrile. Polymers and copolymers based on acrylonitrile and/or methacrylonitrile are especially suitable for use in forming the present membranes. The copolymers are typically formed from monomer mixtures which contain at least 90 mole % of the acrylonitrile-type monomer.

Other monomers in a mixture of monomers used to produce the nitrile-containing polymers may not contain any charged or easily ionizable functional groups (i.e., no acid, amine or quaternized functional groups). The copolymers typically need only include one monomer subunit with a pendent substituted amide or a group which can be derivatized to substituted amide group. The other monomers may, but need not, contain such a functional group. Where the pendent groups include nitrile groups, suitable monomers which may be present with the nitrile-containing monomer in a copolymer are monomers capable of polymerizing with the nitrile-containing monomer. Examples of such monomers include styrene-type monomers (e.g., styrene, methylstyrene, chlorostyrene, or chloromethylstryene), acrylic or methacrylic acid ester-type monomers; conjugated dienes; halogenated olefins; vinylether monomers and other like monomers.

The polymerization may be performed using standard techniques in the art, such as suspension polymerization or emulsion polymerization in an aqueous system. The polymer may also be blended with other polymers that may or may not contain polar functional groups, such substituted amide groups or groups which can be derivatized to substituted amide groups. The polymer can also be grafted to another polymer.

Pendant nitrite groups can be converted into hydroxyalkyl substituted amide groups via reaction with an aldehyde and/or an aldehyde-generating compound in the presence of an acid. Essentially, any aldehyde may be used to modify the nitrite groups. However, the molecular size of the aldehyde molecule may limit the usefulness of the aldehyde where the polymer matrix is in the form of a porous membrane. In such instances, the size of the pores will determine the suitability of the aldehyde by imposing an upper limit on the aldehyde's molecular size. In particular, N-alkylolamide groups where the alkylol portion is a lower alkylol group (i.e., the alkylol group has 1 to 6 carbon atoms) are most commonly employed. Preferably, the nitrite groups are reacted with a relatively small aldehyde such as acetaldehyde or formaldehyde. Formaldehyde or a formaldehyde-generating compound, e.g., dimethoxymethane, trioxane or paraformaldehyde, are particularly suitable for use in modifying membranes formed from a nitrile-containing polymer to increase the hydrophilicity of the membranes surfaces. Methods and specific conditions for modifying nitrile-containing polymer membranes through reaction with an aldehyde are described in U.S. Pat. No. 4,906,379, the disclosure of which is herein incorporated by reference. The duration of the contacting of the molecules of the nitrile-containing polymer with the aldehyde or the aldehyde-generating compound is generally long enough to permit the formation of sufficient substituted amide groups to render the surface hydrophilic but not to hydrophilize the entire matrix structure.

This process, which involves treating a membrane formed from an nitrile-containing polymer with a mixture of acid and aldehyde under aqueous conditions, typically results in the formation of uncharged substituted amide groups only on the surface of the polymer matrix. The polymer which forms the membrane is often crosslinked. This can impart additional strength to the membrane. The chemical treatment used to introduce N-alkylolamide groups to a nitrile-containing polymer can also result in the formation of crosslinks between the polymer molecules. For example, the conditions used to introduce N-methylolamide groups onto the surfaces of a polyacrylonitrile membrane can also result in polyacrylonitrile polymers being crosslinked by methylene-bis-amide linkages.

The membranes employed in the present methods commonly include nitrile-containing polymer throughout the matrix. Only a portion of the nitrile groups of the polymer on the surface of the matrix, however, are generally derivatized to substituted amide groups, preferably N-methylolamide groups. The remaining nitrile groups often remain underivatized thereby providing physical integrity to the polymer matrix. Where the matrix is in the form of a porous article, such as a membrane, the hydrophilic surface of the matrix defines pores in the porous article.

The molecules of the nitrile-containing polymer may also be crosslinked to other such molecules. Crosslinking can provide properties in the polymer matrix which in most applications are desirable, e.g. increased structural rigidity and increased resistance to organic solvents. This can arise from the modification process using acid and aldehyde. Typically, the crosslinking is between the substituted amide groups of the molecules on the surface of the matrix. This can impart additional strength to the membrane. In the embodiments where the substituted amide groups include N-methyolamide groups, the crosslinking is through methylene-bis-amide linkages. When the surface of the polymer matrix is contacted with an aldehyde or an aldehyde-generating compound, the contact can be effected by soaking the matrix in a reagent bath containing the aldehyde and/or the aldehyde-generating compound. The time of soaking, the temperature of the reagent bath, and the concentration of the reagents will depend on the type of aldehyde or aldehyde-generating compound used, the type of nitrile-containing polymer present, the quantity and strength of the acid catalyst, if present, and the matrix properties desired.

Hydrophilic membranes can also be produced by blending and/or coprecipitating a hydrophilization agent with a more hydrophobic polymer. Examples of membranes with hydrophilic surfaces produced by coprecipitating a polyethersulfone with hydrophilic polymer, such as polyethylene glycol and/or polyvinylpyrrolidone are described in U.S. Pat. No. 4,943,374, the disclosure of which is herein incorporated by reference.

In order to permit the membranes to be cleaned effectively to remove residual organic matter and avoid problems with bacterial contamination, it is generally preferable to utilize relatively robust membranes. Cleaning of a membrane can be greatly facilitated if the membrane is capable of withstanding relatively high temperatures (e.g., up to about 50° C.), is capable of withstanding treatment with an oxidizing solution (e.g., an aqueous hypochlorite solution), is capable of withstanding treatment with a surfactant-based cleaning solution, and/or can withstand exposure to aqueous solutions with a range of pH, such as solutions with pHs ranging from about 5 to 11 and, preferably, with pHs ranging from about 2 to about 12.

Downstream Processing of Retentate

The retentate produced by the membrane filtration operation is often pasteurized to ensure that microbial activity is minimized. The pasteurization generally entails raising the internal temperature of the retentate to about 75° C. or above and maintaining that temperature for a sufficient amount of time to kill most of the bacteria present in the solution. For example, this may be accomplished by holding the solution at 75° C. for at least about 10–15 minutes.

The product commonly is pasteurized by subjecting the concentrated retentate to "HTST" treatment. HTST treatment is conducted so that the material is heated sufficiently to kill most of the bacteria present while minimizing the time period that the material is heated. The HTST treatment can be carried out by pumping the concentrate retentate through a steam injector where the protein-containing concentrate is mixed with live steam and can be heated rapidly to about 80–85° C. (circa 280° F.). The heated concentrate is then typically passed through a hold tube, under pressure, for a relatively short period of time, e.g., 5 to 10 seconds. After the hold tube, the heated retentate can be cooled by passage into to a vacuum vessel. The evaporation of water from the retentate under vacuum results in flash cooling of the heated solution, allowing the temperature to be rapidly dropped to the range of 45–50° C. (circa 130–140° F.). This type of treatment has been found to be very effective at destroying bacteria while avoiding substantial chemical degradation of the protein.

To improve its storage properties, the modified oilseed product is typically dried such that the product contains no more than about 12 wt. % moisture, and preferably, no more than about 8 wt. % moisture, based upon the weight of the final dried product. Depending on the drying method utilized and the form of the dried product, after drying the product may be ground into free-flowing solid particles in order to facilitate handling and packaging. For example, if the dried, modified oilseed product is dried into a cake, it can be ground into a dried powder, preferably such that at least about 95 wt. % of the material is in the form of particles having a size of no more than about 10 mesh.

In an alternate process, after pH adjustment to a neutral pH, the liquid retentate may be spray dried to form a dry powdered product. The spray dried product is preferably dried to a water content of no more than about 10 wt. % water and, more preferably, about 4–6 wt. % water. The retentate can be spray dried by passing a concentrated solution (e.g., circa 10–15 wt. % solids) of the retentate through a spray dryer with a dryer inlet temperature of about 160–165° C., a feed pump pressure of about 1500 psig and a discharge air temperature of about 90–95° C.

Figure 17:
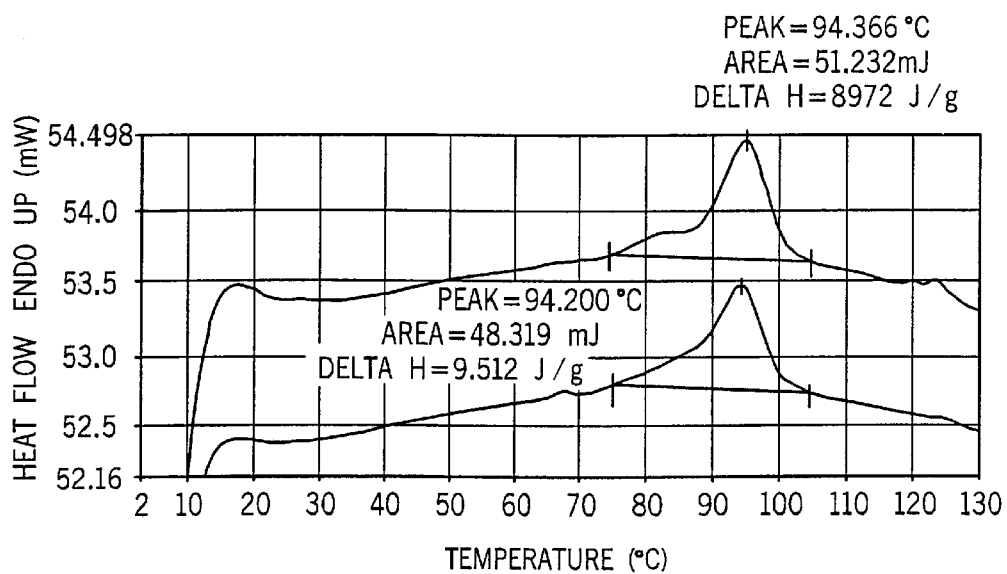
FIG. 17 shows a differential scanning calorimetry scan of a sample of a soy protein product formed by the method described in Example 4.
Figure 18:
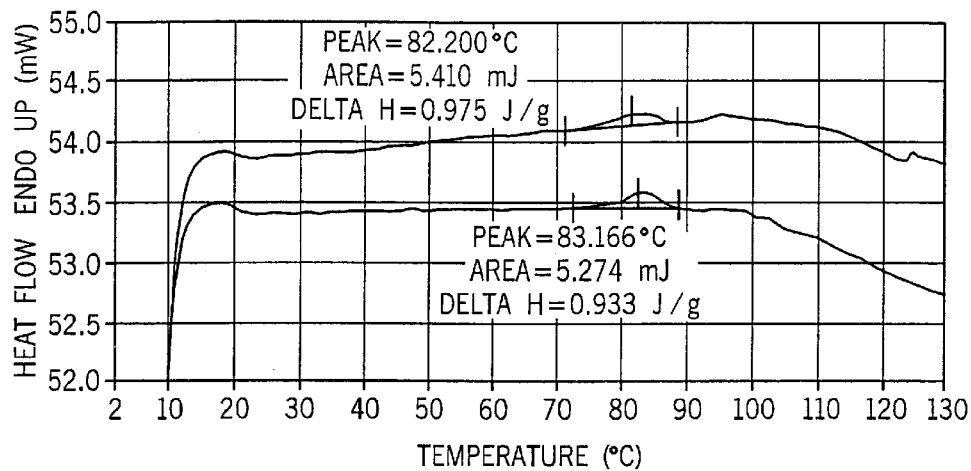
FIG. 18 shows a differential scanning calorimetry scan of a sample of a soy protein product formed by the method described in Example 5.
Figure 19:
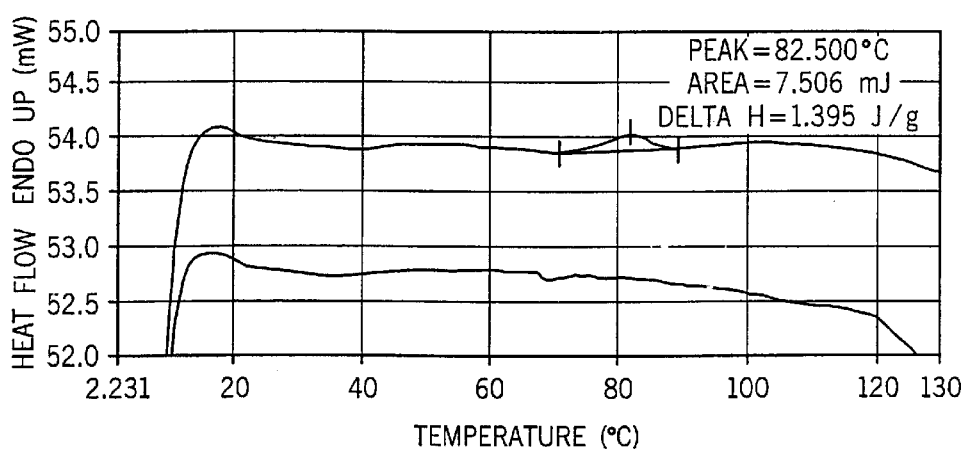
FIG. 19 shows a differential scanning calorimetry scan of a sample of a soy protein product formed by the method described in Example 7.
Figure 20:
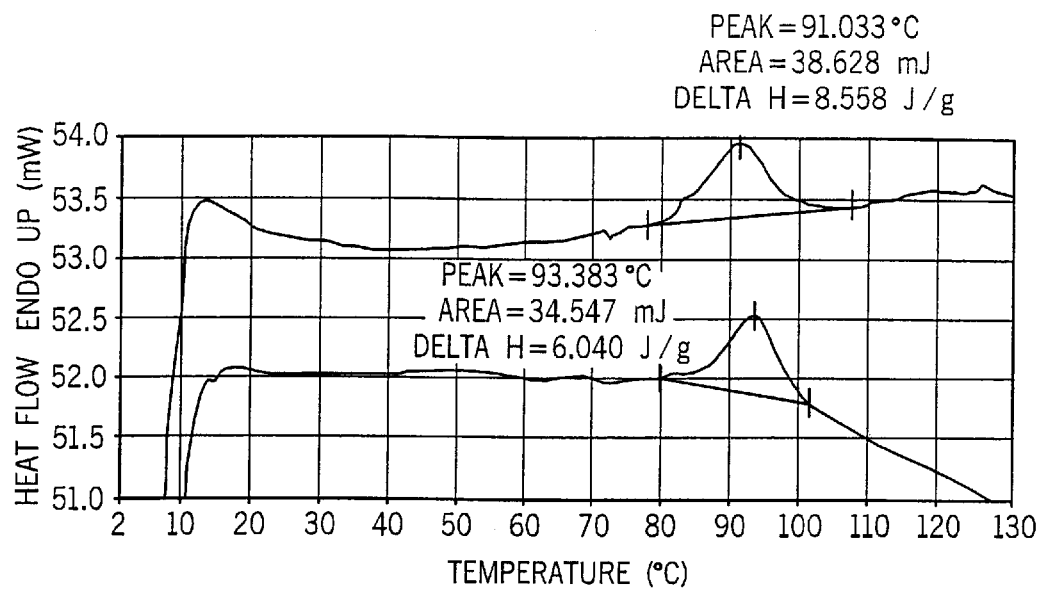
FIG. 20 shows a differential scanning calorimetry scan of a sample of a soy protein product formed by the method described in Example 6.
Figure 21:
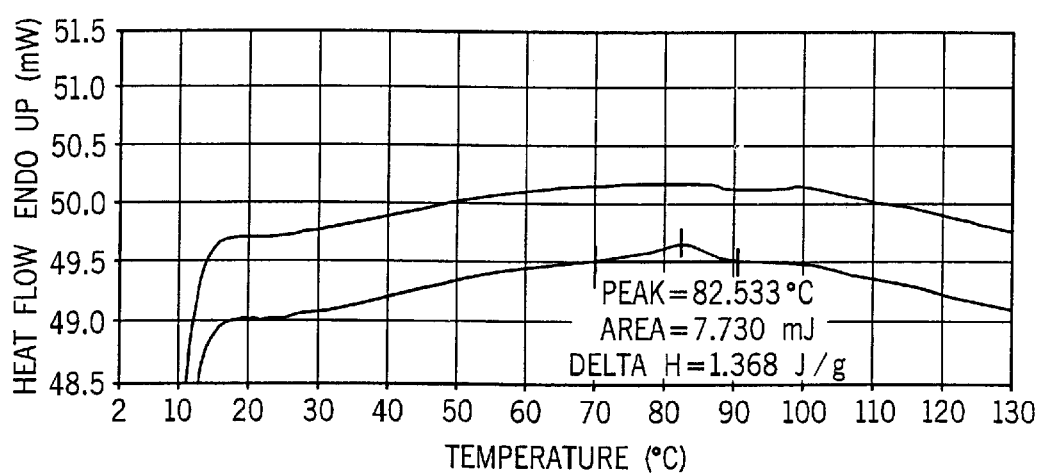
FIG. 21 shows a differential scanning calorimetry scan of a sample of PTI Supro™ 670, a commercial soy protein isolate.
Figure 22:
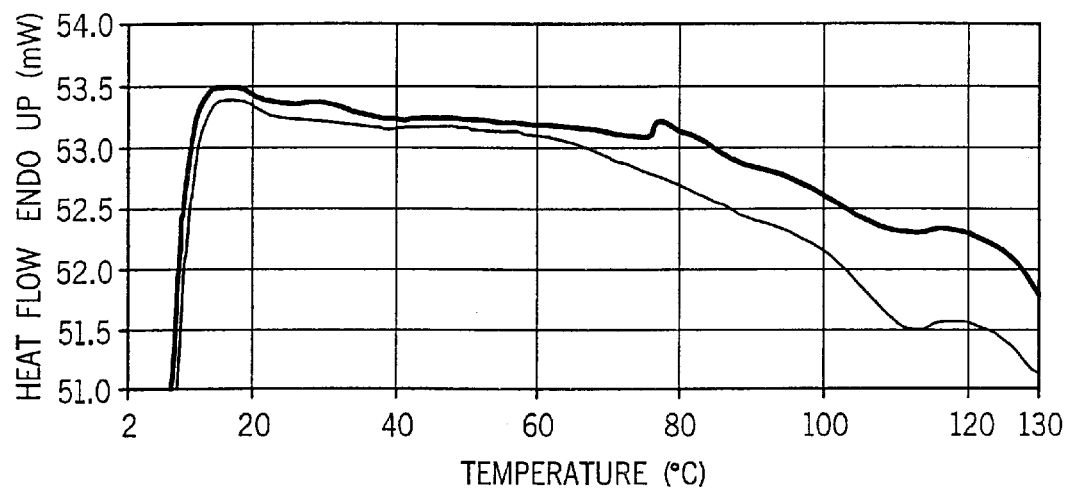
FIG. 22 shows a differential scanning calorimetry scan of a sample of Profam™ 974, a commercial soy protein isolate.
Figure 23:
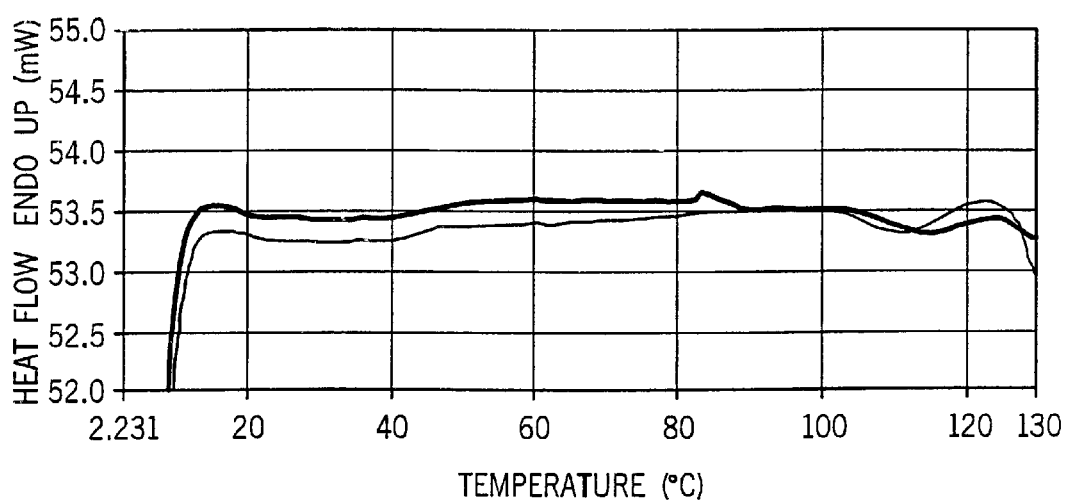
FIG. 23 shows a differential scanning calorimetry scan of a sample of PTI Supro™ 760, a commercial soy protein isolate.

Before the heating which can occur as part of either the spray drying or HTST treatment, it is usually advantageous to adjust the pH of the sample to about neutral. For example, the pH of the retentate is often adjusted to between 6.5 to 7.5 and, preferably between 6.7 and 7.2 prior to any further treatment which involves heating the sample. Heating the concentrated retentate can alter the molecular weight profile and consequently the functionality of the product. Non-heat treated material commonly contains a number of proteins not present in its heat treated counterpart (i.e., material which has been p[rocessed similarly except for the heat treatment step). Compare, for example, the molecular weight profile of the product of Example 4 (shown in FIG. 17) which was not heat treated with that of the product produced according to Example 5 (shown in FIG. 18). The heat treated material contains a number of proteins not present its heated treated counterpart, the product of Example 5. The DSC's of these two samples also show a distinct difference. The material produced according to Example 4 shows a relatively sharp, symmetrical peak at about 93° C. The other material which was not heat treated, that of Example 6, also shows a strong absorption of energy at about 93° C. All of the commercial products show either no absorption peak at all or small relatively weak absorption peak at about 82° C. DSC scans of the two heat treated products produced by the present method (Examples 5 and 7) also only show a relatively weak absorption peak at about 82° C.

In some instances, it may be advantageous to concentrate the retentate produced by the membrane filtration operation prior to a final spray drying step. This can be accomplished using conventional evaporative techniques, generally with the aid of vacuum to avoid extensive heating of the processed soy protein material. Where a concentration step of this type is included in the process, it normally occurs after the pH of the retentate has been adjusted to a neutral pH (e.g., a pH of roughly 6.8–7.0).

Product Characteristics

The present method allows the preparation of a modified oilseed material which can include at least 90 wt. % protein on a dry solids basis. The modified oilseed material can be derived from a variety of precursor oilseed materials, such as soybean meal, canola meal, sunflower meal, cottonseed meal, peanut meal, lupin meal or mixtures thereof. Soybean flake or meal are particularly suitable sources of oilseed protein to utilize in the present method.

In addition to having relatively good solubility, the modified oilseed material produced by the present process often has good properties with respect to its suspendability in aqueous solutions. For example, the present process can be used to provide modified oilseed material which has good suspendability. One measure of the suspendability of a dried oilseed protein product is its "turbidity factor." As employed herein, the "turbidity factor" is defined in terms of the assay described in Example 12. As described in this example, sufficient sample to make a 5 wt. % solution is dissolved/dispersed in a 5 wt. % sucrose solution. After standing for about 1 hour at room temperature, an aliquot of the slurry is diluted 10-fold into water and the absorbance at 500 nm was measured. This absorbance measurement (the "turbidity factor") is a measure of turbidity with higher absorbance values indicating higher turbidity and lower solubility. Preferably, the soy protein isolates produced by the present method have an absorbance at 500 nm of no more than 0.95 in this assay, i.e., a turbidity factor of no more than 0.95. Stated otherwise, a dispersion of 0.5 wt. % of the dried oilseed protein product in a 0.5 wt. % aqueous sucrose solution has an absorbance at 500 nm of no more than 0.95 (after standing for about one hour as a 5 wt. % solution in a 5 wt. % sucrose solution).

The modified oilseed material produced by the present method typically includes a protein fraction with good solubility. For example, modified soy protein products where at least 40 wt. % of the protein in a 50 mg sample of the material is soluble in 1.0 mL water at 25° C. can be produced by the present method. Samples in which at least 50 wt. % of the protein is soluble under these conditions are easily attainable, The present method allows the production of modified oilseed protein products which have desirable color and/or flavor characteristics. Modified oilseed protein materials produced by the present method typically have a substantially bland taste. The products also generally have a very light color as evidenced by their Gardner L values. For example, the present method allows the preparation of modified oilseed materials which contain about 90 wt. % protein (dsb) and have a dry Gardner L value of at least 85. In some instances, e.g., by running the extraction at a weakly alkaline pH of 8–9 and conducting the initial extraction at a relatively low temperature (circa 25–35° C.; 75–95° F.), it may be possible to produce a sample of an oilseed protein isolate which has a Gardner L value (dry) of at least about 88.

For some food related applications the ability of an oilseed protein product to form a gel can be an important functional characteristic. In gelling, the protein denatures to form a loose network of protein surrounding and binding a large volume of water. As employed herein, the term "gel strength" refers to the breaking strength of a 13.5 wt. % aqueous solution of the oilseed protein material after setting and equilibrating the gel at refrigerator temperature (circa 4–5° C.). Modified oilseed protein products prepared by the present method commonly have relatively weak gel strengths. For example, the present method can be used to prepare modified oilseed protein materials where a 13.5 wt. % aqueous solution such material is capable of forms a gel having breaking strength of no more than about 25 g.

During the membrane purification operation, while the levels of some components of the oilseed material are altered considerably, the fat content (measured after acid hydrolysis) in the material remains relatively unchanged. Thus, if the oilseed material is substantially made up of material derived from defatted soybean flakes, the modified product obtained from the present process typically has an fat content of about 1 to 3 wt. % (on a dry solids basis). For example, processing of defatted oilseed material, such as soybean meal, by the present method can produce a modified oilseed product having a protein content of 90 wt. % (dsb) or greater with no more than about 3 wt. % (dsb) and preferably, no more than about 2 wt. % fat. As used herein, the term "fat" refers to triacylglycerols and phospholipids.

The modified oilseed material can be used to produce a protein supplemented food product. Examples of protein supplemented food products include protein fortified beverages. The modified oilseed material can also be used as a protein supplement to form a meat product (e.g., a ground chicken product) or a baked good.

Beyond flavor, other important characteristics of soy protein isolates include those relating to solubility, suspendability, color, and foaming. Dispersability can facilitate easy mixing of the ingredients (whether a dry formulated mix or the dry isolates) into water, ideally leading to a homogenous suspension. Solubility is desired to reduce the amount of particulates that can be found in the finished beverages. Soy isolates have a history of leaving gritty particles in the final beverage, a major contrast to milk proteins. Suspendability is desired to prevent the settling of the insoluble components from the finished formula upon standing. Color generally means whiteness in this context. Tan and brown solutions can be difficult to color into white (milk-like) or brightly colored (fruit-like) colors. A related property is the clarity of solutions of the protein isolate. Most soy and milk protein solutions are cloudy or opalescent at neutral pH. Reducing the pH for acidic beverages (like fruit juice-based beverages) commonly increases the opacity of the suspension. Finally, foaming is usually undesired in beverages as it can complicate mixing. However, in some products (e.g., milk shake-like products) foaming can be a strong positive. In such cases, clarity is probably undesired.

Process Equipment and Design

The present method can be carried out using a variety of conventional apparatus of the type generally employed to handle extraction of solid materials. For example, in the original laboratory scale experiments described herein, the extractions were carried out in open vessels which were capable of being manually mixed (e.g., by stirring the slurry of soybean material with a spatula). On a commercial scale, the extraction step would commonly be carried out in one or more temperature controlled vessels which allow controlled agitation of their contents (see, e.g., the series of extraction tanks depicted in FIG. 5). In general, extraction, separation, concentration and drying apparatus employed in the present method are capable of heating and maintaining the temperature of the material within a desired range (e.g., about 40 to 50° C.) as well as controlling rates of addition of other components and/or maintaining consistent control over mixing conditions within a vessel.

Advantageous overall choice of equipment and processing will depend, in part, upon selection, among the approaches, of the one which most readily facilitates an overall cost-effective and efficient processing scheme in large scale implementation. The considerations in selecting overall processes relate to design of the system to accommodate a number of objectives including one or more of the following:

1. Maintenance of desired temperature, mixing conditions and pH if control of the extraction medium;
2. Removal of particles of certain sizes to clarify the extract;
3. Maintenance of the extract flowing over the membrane in specific temperature, viscosity and/or concentration ranges;
4. Ease of cleaning and the ability to effectively sanitize equipment, particularly with respect to the membrane filtration system.

In addition to extraction systems, liquid clarification apparatus, and membrane filtration systems, a number of other types conventional apparatus may be utilized to carry out the present method. Suitable examples of such apparatus include mixing and feed tanks, pumps, heating apparatus, drying equipment and the like. Depending on the process design and equipment capabilities, the retentate from the membrane filtration system may be pH adjusted, heat treated and/or dried in one or more additional pieces of equipment.

The following examples are presented to illustrate the present invention and to assist one of ordinary skill in making and using the same. The examples are not intended in any way to limit the scope of the invention.

EXAMPLE 1

Membrane Processing

A membrane process evaluation was conducted to examine the effect of membrane pore size and membrane material. A large pore size can produce higher throughputs and hence require a smaller membrane area in a membrane separation system. The choice of an appropriate membrane material can also help reduce the rate of fouling and improve membrane cleanability.

The examination of the effect of membrane pore size was done using a bench top flat sheet microfiltration unit. A range of membranes from microfiltration (MF) through nanofiltration (e.g., the 200–500 MWCO membrane) were selected and the resulting permeates were tested for residual protein (see Table 2). The objective was to identify the range of pore sizes at which membranes start to reject a substantial fraction of proteins (as indicated by low levels of proteins in the resulting permeates). As shown in Table 2, all of the membranes tested rejected proteins except for the 0.1 micron PES microfiltration membrane at the higher pressure level (100 psi). The results suggested, surprisingly, that microfiltration membranes could be utilized in the purification of aqueous solutions of oilseed protein without a substantial loss of material. This result provided an opportunity to realize a number of process advantages (with respect to the ultrafiltration membranes reported for use in such processes). The potential process advantages include higher throughputs, lower membrane system costs, and a wider selection of membrane materials.

TABLE 2

Membrane Pore Size and Protein Rejection

| Membrane Type | Pore Size/ MWCO[a] | Pressure (psi) | Permeate Appearance | Protein in Permeate (mg/ 10 ml) | % Protein Rejection[b] |
|---|---|---|---|---|---|
| Koch PES | 0.1 | 50 | Clear, Yellowish | 26 | 95% |
|  |  | 100 | Turbid | 198 | 58% |
| Koch PVDF[c] | 180,000 | 50 | Clear, Yellowish | 55 | 88% |
| Osmonics[d] | 50,000 | 100 | Clear, Light Yellow | <10 | >98% |
|  | 20,000 | 100 | Clear, Light Yellow | <10 | >98% |
|  | 10,000 | 125 | Clear, Colorless | <10 | >98% |
| Film Tec[e] | 200–500 | 150 | Clear, Colorless | <10 | >98% |

[a]MWCO - Molecular Weight Cut-Off (in daltons); pore size in microns;
[b]Starting protein content in membrane feed is about 470 mg protein/10 ml;
[c]PVDF - Polyvinylidene fluoride;
[d]Osmonics Membranes:
50,000 MWCO modified PAN membrane;
20,000 MWCO membrane;
10,000 MWCO membrane;
[e]Film Tec - 200–500 MWCO thin film polyamide composite membrane.

Several larger pore microfiltration membranes were then evaluated using a spiral membrane module. A 2 inch diameter spiral element (about 0.2 sq.ft. of membrane area) was used for testing. The following microfiltration membranes were examined:

0.1 micron PES membrane (available from Koch Membrane Systems, Inc., Wilmington Mass.);

1.2 micron PES membrane (available from Koch Membrane Systems, Inc.);

Modified PAN 500,000 MWCO (available from Osmonics, Inc., Minnetonka, Minn.).

Figure 2:
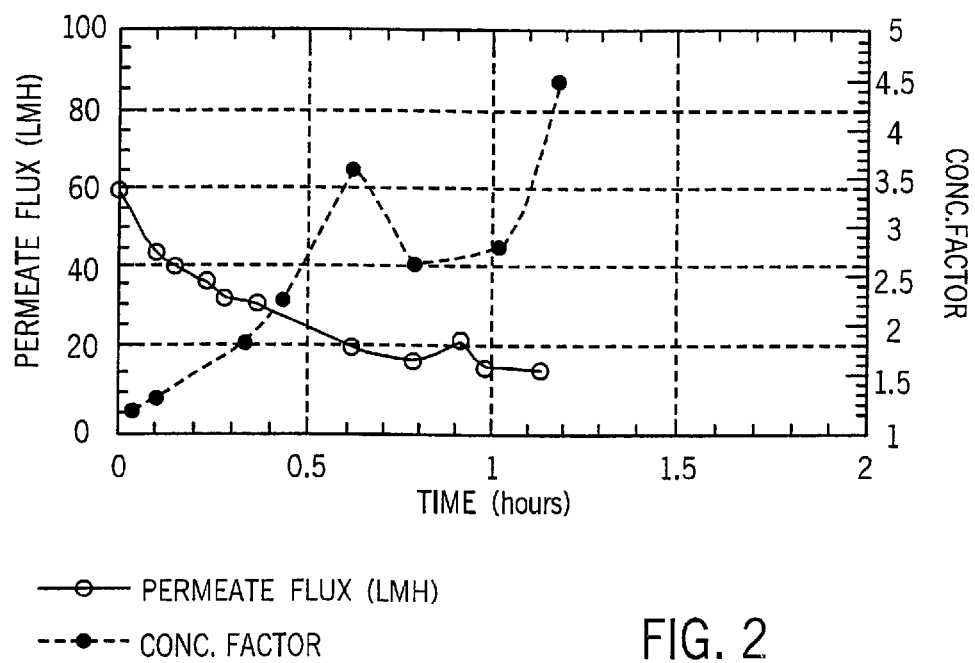
FIG. 2 shows a graph of a plot of permeate flux as a function of time for membrane filtration of a clarified soy protein extract using a 0.1 micron polyethersulfone ("PES") membrane.
Figure 3:
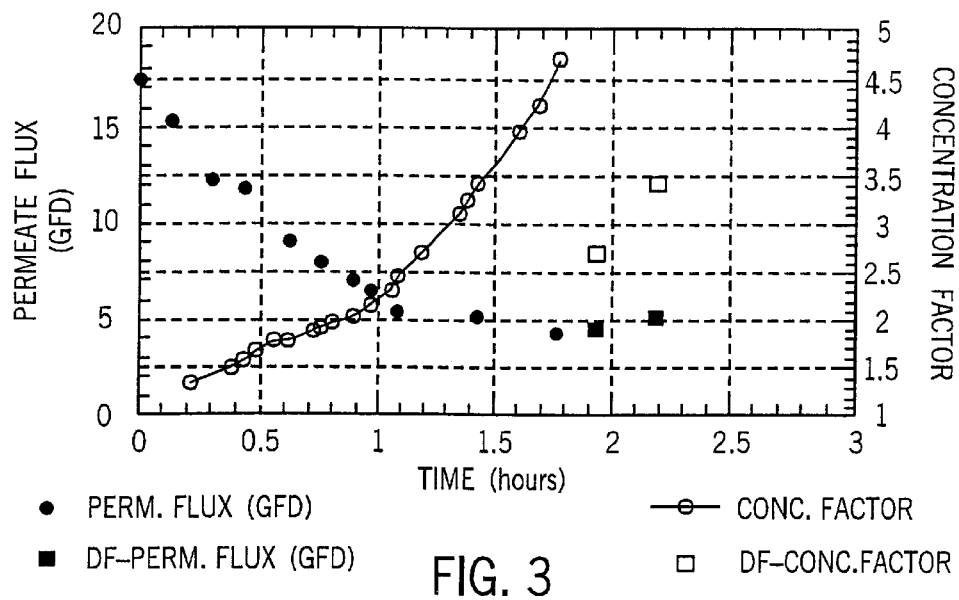
FIG. 3 shows a graph of a plot of permeate flux as a function of time for membrane filtration of a clarified soy protein extract using a 1.2 micron polyethersulfone ("PES") membrane.
Figure 4:
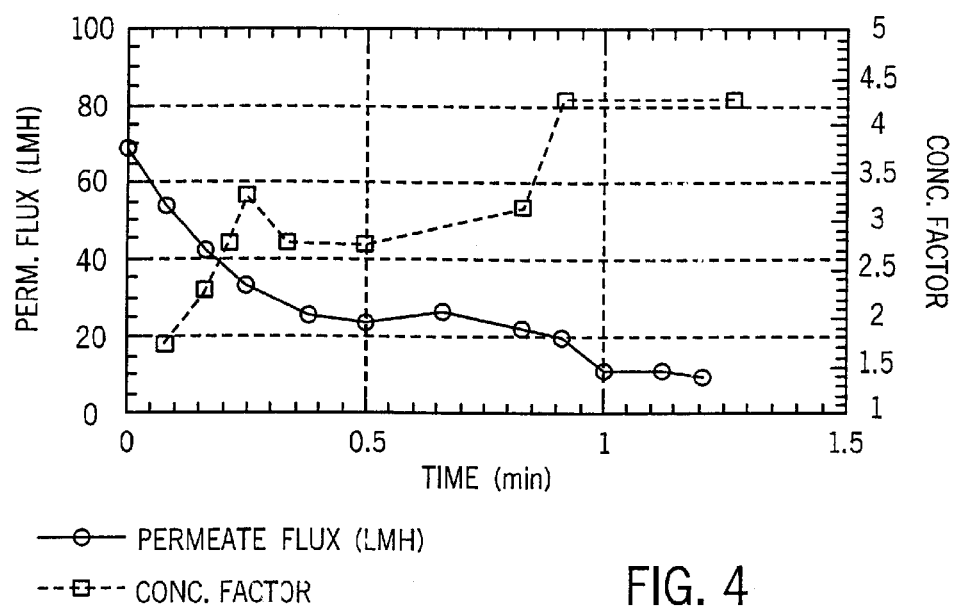
FIG. 4 shows a graph of a plot of permeate flux as a function of time for membrane filtration of a clarified soy protein extract using a 500,000 MWCO modified polyacrylonitrile ("modified PAN") membrane.

With each of the membranes, the extract stream was concentrated by a factor of 3×–4×. The concentrate was then diafiltered by adding an equivalent amount of water (to concentrated retentate volume) and reconcentrating to 3× (based on the original feed volume). The diafiltration step was then repeated. Typical permeate flux vs. time plots for each of the membranes are as shown in FIGS. 2–4. Out of these three membranes, the 500,000 MWCO modified PAN membrane showed a higher permeate flux (FIG. 4) than the two PES microfiltration membranes (FIGS. 2 and 3). The modified PAN membrane also exhibited good cleanability.

EXAMPLE 2

Bacteria Control

A sample (Process Run 3B) was set up as an extended run on the membrane to monitor as bacterial growth in the protein stream in addition to membrane separation performance. Bacterial growth was analyzed as total plate count (cfu/g) in the concentrate stream as a function of time. After about 8 hours of running the membrane separation step, during a experiment at about 80° F. using a 1.2 micron PES membrane, the pH of the protein concentrate started dropping and the concentrate started to smell somewhat sour. Samples were taken aseptically during the course of this experiment and subsequently checked for bacterial growth (total plate count). The results of this experiment established that bacteria grew exponentially when the membrane separation step was conducted at about 80° F.

In order to control and minimize the bacterial growth, process conditions similar to those employed in membrane clarification of dextrose solutions were examined. Dextrose clarification is typically done at 140° F. (60° C.) or above to control microbial growth. During the initial experiments described above, the membrane separation step was run at 80° F. This is known to be a good temperature for bacteria to grow. A number of experiments were then run with the temperature of the concentrate feed during membrane separation controlled at 135°–145° F. (circa 57–63° C.). This work showed that bacterial growth could be substantially suppressed in the protein concentrate at these temperatures (see Table 3). For example, when the concentrate was held at 80° F., the total plate count increased from 6E+04 in extract to about 6E+05 within two hours. On the other hand, at 140° F. (60° C.), the total plate count only increased from 3E+04 in extract to about 6E+04 over a period of two hours. It was also observed that protein denaturization appeared to be minimized when the membrane separation was conducted at temperatures of 135°–140° F.(57–60° C.). When the retentate was held above 141IF (61° C. or higher), during the membrane separation step, the product appeared to be more viscous than that produced at lower temperatures and exhibited a greater tendency to gel during the subsequent drying step.

TABLE 3

Bacterial Growth in Retentate at 140° F.

| Sample | pH | Coliform (cfu/g) | Total Plate Count (cfu/g) |
| --- | --- | --- | --- |
| Feed | 7.75 | 100 | $3.1 \times 10^4$ |
| Heated Feed | 7.78 | <100 | $2.4 \times 10^4$ |
| Retentate 1 Hour | 7.79 | <100 | $9.3 \times 10^4$ |
| Retentate 2 Hours | 7.71 | <100 | $5.8 \times 10^4$ |
| Permeate | 7.63 | <100 | $1.6 \times 10^3$ |
| Diafiltration Permeate | 7.53 | <100 | 200 |

EXAMPLE 3

A series of eight different process runs (2A–2H) were carried out with variations in processing temperatures, membrane type and diafiltration conditions. A summary of the process conditions for the different runs is shown in Table 4. Table 5 lists yields and process efficiencies for the various runs.

Extractions were carried out in a stainless steel pail. Soybean white flakes and water were mixed together manually with a spoon. The pH of the slurry was adjusted to 8.5 with aqueous NaOH and the resulting alkaline slurry was allowed to stand at room temperature (circa 68–70° F.). After 30 minutes, the spent flakes were separated from the extract liquor by manually squeezing the liquor through a nylon cloth. The extract liquor was clarified using a lab centrifuge. The clarified liquor was concentrated from 3× to 4.5× using a spiral wound microfiltration membrane (membrane area of 2 sq.ft.). The concentrated protein liquor was subjected to 1 or 2 diafiltration steps to increase the protein content of the concentrate, preferably to increase the protein content to at least 90% (dsb). Each diafiltration step was carried out by a one volume (equivalent to the volume of the concentrate) addition and removal of water. The pH of the diafiltered retentate was then adjusted to 6.8 with dilute HCl and spray dried using a laboratory spray drier. Typically, 40–60 grams of spray dried isolate (water content circa 4 wt. %) was recovered from each batch.

Overall protein yield as defined for these experiments is the amount of protein solids in the dryer feed, adjusted for protein content of isolate (90.%) and moisture content (4%), divided by the amount of starting white flakes. For comparison purposes, two isolates were produced using the conventional acid precipitation process (data not shown). These tests had overall protein yields of 38.0% and 37.5%, respectively. The overall protein yields for commercial soy isolate processes based on conventional acid precipitation process are believed to be about 35–37%.

The overall protein yields that were achieved in initial experiments using the present process were in the 33–36% range. It was observed, however, that a significant amount of protein was being left in the membrane system after the concentrate was drained from the system. Calculations showed that if all of the protein could be recovered from the membrane system, the overall yields should be in the 42–43% range. By flushing the membrane system with water after draining out the retentate, overall protein yields of 40% were achieved. The higher yield that can be achieved with the present process is likely due to the fact that a portion of proteins that are lost to the whey stream in a conventional acid precipitation process can be retained in a membrane process.

EXAMPLE 4

Extractions were carried out batchwise in a 50 gallon stainless steel tank. This batch size utilized 30 lbs of white flakes and 30 gallons of water. This allowed the extract batch to be extracted and centrifuged in less than 2 hours with laboratory scale equipment. The amount of bacteria growth which occurs during the extraction operation can be minimized by limiting the amount of time needed to carry out the extraction and centrifugation operations.

The extraction tank, centrifuge, centrifuge filter cloth and all utensils were sanitized with hot water and sodium hypochlorite (NaOCl) prior to use. City water (28.8 gal) at 80° F. (27° C.) was introduced into the extraction tank. After the extraction tank agitator was started, 30 lbs of soy white flakes were introduced into the extraction tank. The pH of the resulting slurry was adjusted by adding a solution of 92 grams of sodium hydroxide dissolved in 400 mL city water. The slurry was then stirred at room temperature for 30 minutes. The pH of the suspension is recorded at the beginning and end of the extraction process. The initial pH of the aqueous phase of the slurry was about 9.0. After stirring for minutes, the pH of the extract was typically about 8.4 to 8.5.

A Sharples basket centrifuge was then started with the bowl set to 1800 rpm. The extracted slurry was manually fed to the centrifuge at a rate of about 0.5 gallons per minute ("gpm"). Clarified extract liquor was collected and transferred to the microfiltration feed tank. When the centrifuge basket was full of spent flakes (after approximately 90 lbs of feed slurry), the cake is washed with 4000 ml (circa 9 lbs) of city water. The centrifuge was then stopped and the spent flakes was discarded. After rinsing the centrifuge and washing the filter cloth, the centrifuge was restarted and the extraction sequence repeated until all of the slurry in the extraction tank had been separated. The clarified extract contained about 4.0–5.0% soluble protein and 1.5–2.0% dissolved non-protein material and had a pH of about 7.5 to 7.8.

After about 150 lbs of extract solution was transferred from the extraction system to the membrane feed tank, the extract liquor was recirculated at a flow rate of about 9 gpm through a heater system which bypassed the membranes. The water temperature of the hot water bath in the heater system was set at 140° F. (60° C.). This is a temperature which had been shown to retard bacteria growth in the clarified extract (see Example 2).

After all of the extract liquor has been transferred to the membrane feed tank, the extract liquor at 140° F. was recirculated over the membranes at 15 gpm with the membrane back pressure set at 10 psig. The membrane filtration system contained four modified PAN membranes with a nominal 50,000 MWCO (MX-50 membranes available from Osmonics, Minnetonka, Minn.) arranged in series. The total filtration surface area of the array of membranes was about 12 sq. meters.

The membrane permeate was collected and monitored by weighing the amount of permeate collected. After being weighed, the permeate was discarded. When the amount of permeate collected equaled 67% of original total weight of the clarified extract, the protein in the retentate had been concentrated by a 3× factor, from about 4% to about 12%. During the initial concentration phase of the membrane filtration, the permeate flux typically varied from an initial rate of about 2600 ml/min to about 1500 ml/min during the later stages of the concentration.

At this point the concentration operation was stopped by closing the permeate valves and opening the back-pressure valve on the membrane. For the first diafiltration step, 140° F. (60° C.) water was added to the retentate in the membrane feed tank in an amount equal to the weight of the retentate after the concentration step. In other words, sufficient water ("diafiltration water") was added to lower the protein concentration by a factor of 2× (i.e., the volume of the retentate was doubled by the addition of the water). The permeate valves were then opened and the back-pressure on the membranes was again set to 10 psig. The permeate was collected and weighed before discarding. When the weight of the diafiltration permeate was equal to the weight of the diafiltration water, the first diafiltration was complete. The diafiltration operation was then repeated a second time. After the second diafiltration had been completed, the solids in the retentate normally contained about 90 to 93% wt protein.

After the second diafiltration, the retentate from the membrane system was transferred to a mixing tank. The membrane system was flushed with 7 gallons of city water to recover additional protein from the system. This flush water was combined with the retentate in the mixing tank. Prior to the next operation, the pH of the retentate was adjusted to 6.8 to 7.0 with dilute HCl. Following pH adjustment, the retentate was spray dried to yield a soy protein product which contained circa 90–93 wt. % protein (dry solids basis) and had a water content of about 6 wt. %. The spray dried soy protein product had an average particle size of about 20 microns and a total bacterial count of less than 50,000 cfu/g.

EXAMPLE 5

Batches (30 lbs) of soy white flakes were extracted and processed according to the procedure described in Example 4 except that after pH adjustment (to pH 6.8–7.0) the retentate was subjected to treatment at a relatively high temperature for a short time ("HTST") in order to pasteurize the retentate.

The HTST step consists of pumping the concentrate at 1 gpm to a steam injector. In the steam injector, the concentrate is mixed with live steam and heated instantly to 280° F. The heated concentrate passes through a hold tube, under pressure, for 5 seconds. After the hold tube, the product flows in to a vacuum vessel where the product is flash cooled to 130° F. The product is then spray dried. The HTST step is very effective in killing bacteria, even thermophiles. Total plate counts could be reduced from as high as 300,000 cfu/g to around 100 cfu/g after the HTST operation.

The HTST treated material was then spray dried using the procedure described in Example 4 to yield a soy protein product. The spray dried soy protein product had an average particle size of about 20 microns, contained circa 90 wt. % protein (dry solids basis) and had a water content of about 8–9 wt. %.

EXAMPLE 6

Batches (30 lbs) of soy white flakes were extracted and processed according to the procedure described in Example 4 except that at the beginning of the extraction the pH of the resulting slurry was adjusted by adding a solution of 165 grams of sodium hydroxide dissolved in 1,000 mL city water. The initial pH of the aqueous phase of the slurry was about 9.8 and after stirring for 30 minutes, the pH of the extract was about 9.5. Following membrane filtration and pH adjustment, the retentate was spray dried to yield a soy protein product which contained circa 90 wt. % protein (dry solids basis) and had a water content of 8–9 wt. %. The spray dried soy protein product had an average particle size of about 20 microns and a total bacterial count of less than 50,000 cfu/g.

EXAMPLE 7

Batches (30 lbs) of soy white flakes were extracted and processed according to the procedure described in Example 4. At the beginning of the extraction the pH of the resulting slurry was adjusted by adding a solution of 165 grams of sodium hydroxide dissolved in 1,000 mL city water. The initial pH of the aqueous phase of the slurry was about 9.8 and after stirring for 30 minutes, the pH of the extract was about 9.5. After pH adjustment (to pH 6.8–7.0), the retentate was subjected to treatment at a relatively high temperature for a short time ("HTST") in order to pasteurize the retentate using the procedure described in Example 5. The HTST treated material was then spray dried using the procedure described in Example 4 to yield a soy protein product. The spray dried soy protein product had an average particle size of about 20 microns, contained circa 88–89 wt. % protein (dry solids basis) and had a water content of about 8–9 wt. %.

EXAMPLE 8

Characterization of Soy Protein Isolates

Four soy protein isolate samples were manufactured using the procedures described in Examples 4–7 and were subjected to a number of tests to characterize the samples. The samples used for testing were composites of multiple production runs in a number of cases.

The four isolate samples were manufactured by extracting soy white flakes at either pH 8 (Ex. 4 and 5) or pH 9.5 (Ex. 6 and 7). The extracted protein was concentrated and diafiltered using a membrane system, pH adjusted to 6.8–7.0, then either passed through a HTST system (Ex. 5 and 7) or not (Ex. 4 and 6), and finally spray dried. The samples tested were composites of multiple production runs in a number of cases.

The four prototypes were assayed for protein content (dry basis), nitrogen solubility index (NSI), protein solubility (true solubility) and fat content (by acid hydrolysis, as is—"F.A.H.") and the results are shown in Table 6. Results for some commercial soy protein isolate samples are also included for comparison. PTI Supro™ 515 is a commercial soy protein isolate recommended for use in processed meats. PTI Supro™ 760 is a commercial soy protein isolate recommended for beverage applications. A number of commercial samples have much higher fat contents. Whether this is a result of processing or post-recovery addition of fat is not clear.

Protein content was analyzed using either the Kjeldahl or Leco procedures, or near-infrared (NIR) spectroscopy. Lysine (total and available) was analyzed using standard methodology.

The level of free amino nitrogen (FAN) was determined using the ninhydrin method (see e.g., European Brewery Convention, 1987). Solid samples of oilseed material were extracted with water. In solution, each sample was diluted as needed to obtain 1–3 mg/L FAN. The diluted samples were reacted with a buffered ninhydrin solution in a boiling water bath for 16 min. After cooling in a 20° C. water bath for 10–20 min, the samples were diluted using potassium iodate in a water/ethanol solution. Within 30 min of this treatment, the absorbance at 570 nm was measured versus a control solution containing water but otherwise treated like the samples. The FAN level was calculated from a standard line using glycine at various concentrations as the reference.

Protein solubility was determined by weighing 50 mg samples of the soy products into microfuge tubes. The sample were dispersed in 1.0 mL deionized water at room temperature and allowed to stand for one hour. After centrifuging the samples in a benchtop microfuge for 5 minutes, 50 μL aliquots of supernatant were diluted with 950 μL of deionized water. The resulting solutions were diluted a second time by placing 5 μL of the diluted supernatant into a glass tube containing 1.0 mL deionized water. Bradford reagent (1.0 mL) was added to the tube and mixed immediately. The absorbance was read at 595 nm after 5 minutes. A standard curve based on bovine serum albumin was used to calculate the amount of protein in the original supernatants. The % solubility results reported in Table 6 were calculated based on an assumed protein concentration of 90% in the protein isolates.

TABLE 6

Protein Content, NSI, Protein Solubility and Fat Content of Soy Protein Isolates

| Sample | Protein (%) | NSI | Solubility (%) | F.A.H. (%) |
|---|---|---|---|---|
| Ex. 4 | 89.9 | 85.8 | 43.9 | 1.49 |
| Ex. 5 | 90.6 | 85.1 | 54.8 | 1.17 |
| Ex. 6 | 89.9 | 95.3 | 58.2 | 1.67 |
| Ex. 7 | 88.6 | 33.4 | 13.0 | 1.35 |
| PTI Supro ™ 515 | 91.1 | 39.6 | 27.9 | — |
| PTI Supro ™ 760 | 90.1 | 31.6 | 24.0 | 2.08 |
| PTI Supro ™ 590 | — | — | 31.5 | 2.40 |
| PTI Supro ™ 661 | 91.2 | — | 24.8 | 2.07 |
| PTI Supro ™ 710 | — | — | 36.3 | 1.30 |

One of the most obvious differences between the prototypes and commercial samples is the color. The prototypes are much lighter and brighter in color than the commercial soy isolates. This is illustrated by comparison of the readings from a Gardner colorimeter on the samples (see Table 7). A higher value of "L" indicates a whiter product.

TABLE 7

Color of Prototype and Commercial Isolate Samples

| Sample | L |
|---|---|
| Ex. 4 | 88.1 |
| Ex. 5 | 89.1 |
| Ex. 6 | 86.9 |
| Ex. 7 | 86.4 |
| PTI Supro ™ 515 | 85.2 |
| PTI Supro ™ 760 | 86.5 |

EXAMPLE 10

Gel Properties of Soy Protein Isolates

One measure of the ability of soy protein isolates to interact with water can be seen in gelling tests. In gelling, the protein denatures to form a loose network of protein surrounding and binding a large volume of water. A number of gelling measures can be used, but measurement of gel strength after setting and equilibrating at refrigerator temperature was chosen.

The soy gel determinations were conducted according to the following procedure:

1. Weigh 3.5 g soy protein isolate to a 50 mL tripour plastic beaker.
2. Measure out 30 mL phosphate buffer in a graduated cylinder (0.25% $NaH_2PO_4$ 0.7% NaCl adjusted to pH 5.7 with NaOH).
3. Add approximately 10 mL of buffer to soy. Mix with a spatula until the buffer is absorbed then add another 10 mL buffer. Continue mixing and adding until all of the buffer is mixed in and the mixture is homogenous. Insure that all of the soy remains with the tripour.
4. Mix on high for 30 seconds with the hand held homogenizer.
5. Cover with aluminum foil.
6. Cook in 90° C. water bath for 30 minutes minimizing time before samples are cooked to prevent settling. Cool in room temp bath for 30 minutes. Refrigerate overnight.
7. Measure gel strength (deformation) by determining resistance of the 13.5 wt. % soy isolate gel to a penetrating force using a Texture Technologies Ti2× Texture Analyzer. Mounted the ½ inch diameter acrylic cylinder on the instrument.

Centered the cylinder over the tripour containing the gel. Set the penetration speed for 3 mm/sec. When a resistance of 4 g was reached, the probe slowed to 2 mm/second and data acquisition was started. The probe was allowed to penetrate the gel for 15 mm then withdrawn at 5 mm/sec.

Figure 6:
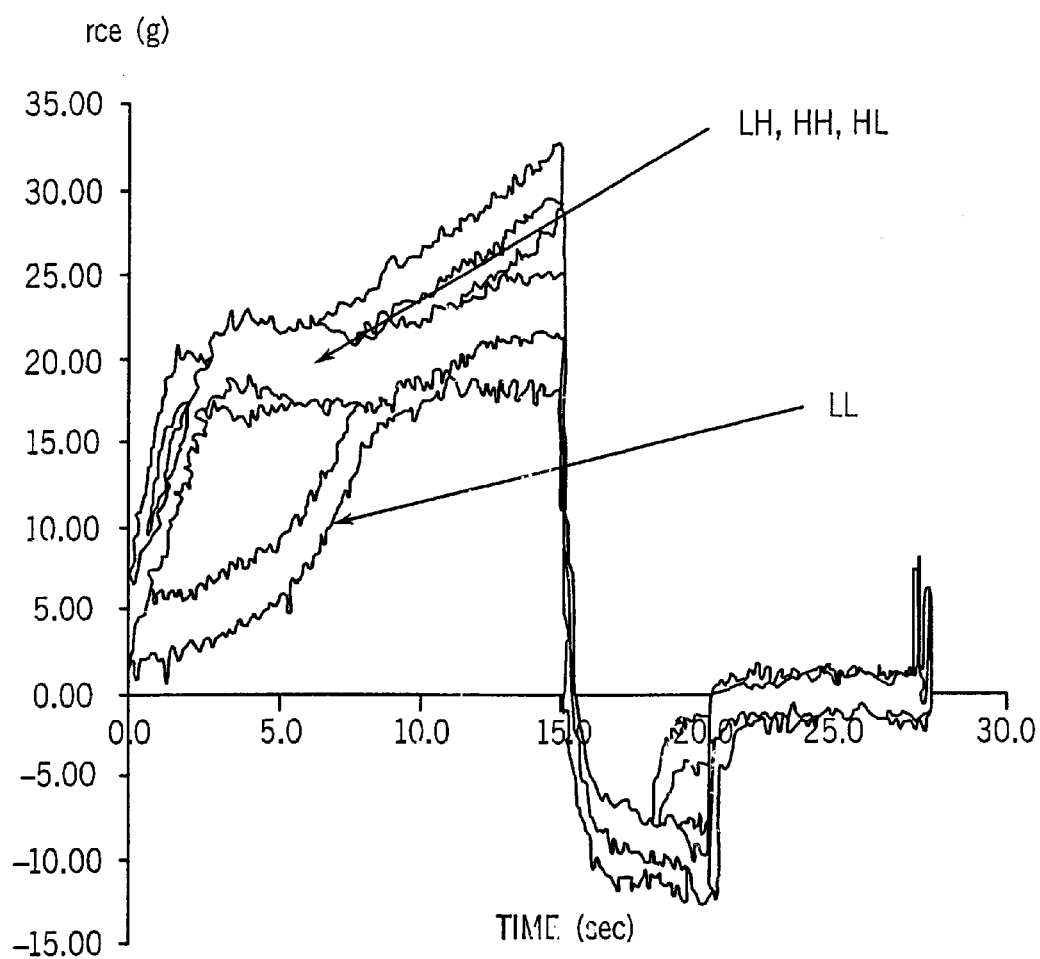
FIG. 6 shows a plot of the results of gel strength tests of four examples of modified soy protein products formed by the present method—LL (Ex. 4), LH (Ex. 5), HL (Ex. 6), HH (Ex. 7).

The results of the gel tests are shown in FIG. 6. A traditional pattern of gel compression involves a rising resistance, followed by a break, followed by continuing resistance. The breaking strength is one measure of gel strength. Three of the prototypes follow this pattern (see FIG. 6), but one prototype (Ex. 4; "LL") shows no break point. Many commercial samples of soy protein isolate also do not form gels. Some readily separate after cooking, some form non-breaking pastes and other form weak gels.

The weakness of the gels formed from the samples prepared according to Examples 4–7 is another major observation. The three breaking prototypes showed break strengths around 20 g. For comparison, a series of gelatin gels made at differing concentrations were run. The gelatin gel showing comparable break strength (circa 20 g) was at 2% w/w (data not shown). Soy gels at 12–13% w/w/ can have break strengths of up to about 70 g, equivalent to gelatin gels between 2 and 5% w/w. In summary, the gel strength of soy isolates is typically low and the four prototypes described in Examples 4–7 are at the low end of the range expected for soy isolates.

EXAMPLE 11

Flavor Attributes of Soy Protein Isolates

Beverage products generally place some different demands on the physical properties of protein isolates. Flavor is a much more important attribute because the protein isolate can be a much larger portion of the finished product. This is especially the case with beverages intended to meet the health claim criteria. Some fortified adult beverages contain small amounts of isolate with the bulk of the protein derived from milk products. In order to successfully compete with such products, beverages based on vegetable protein isolates must have comparable flavor qualities.

A flavor panel conducted tests on 5% dispersions of the protein isolates in water. The four prototype isolates from Examples 4–7 were compared to PTI Supro™ 760, an isolate commonly used in beverages. Preparation of the test solutions allowed a number of observations to be made. The prototypes did not disperse well, compared to the Supro™ 760 and had to be mixed in with a Waring blender. Consequently, about 4-times as much foaming was observed with the prototypes. The resulting solutions also had a different "color" than the commercial product, essentially appearing to be darker. The Example 8 product was the darkest.

Some of the flavor attributes identified by the flavor panel are shown in Table 8. With the exception of the Example 7 product, the prototypes were associated more with grainy flavors than the commercial product. This could be a significant advantage in formulating beverages.

The same five isolates were then formulated into an adult beverage similar to one sold ready-to-eat in cans. The product formula only included soy protein product at 0.7% of the formula (as is). The total formula is about 30% solids, 12% protein (dry basis) and about 18% of the protein present is from the soy isolate. The overall contribution of soy protein to the formula is about 0.6%. Not surprisingly, there were no observable differences in flavor between the finished products.

TABLE 8

Flavor Attributes of Soy Protein Isolates

| Sample | Total Intensity of Flavor | Flavor Notes |
| --- | --- | --- |
| Supro ™ 760 | 1 | Cardboard, starchy, starchy mouthfeel, sour |
| Ex. 4 | 1–1.5 | Boiled rice, sweet, starchy, starchy mouthfeel |
| Ex. 5 | 1.5 | Sweet grain, oat-like, sour, wallpaper paste |
| Ex. 6 | 0.5 | Grainy, grassy-green, dimethylsulfide (like cream corn), rice water |
| Ex. 7 | 1–1.5 | Wet wool, starchy, starchy mouthfeel, slightly earthy |

EXAMPLE 12

Other Attributes of Soy Protein Isolates

Figure 7A:
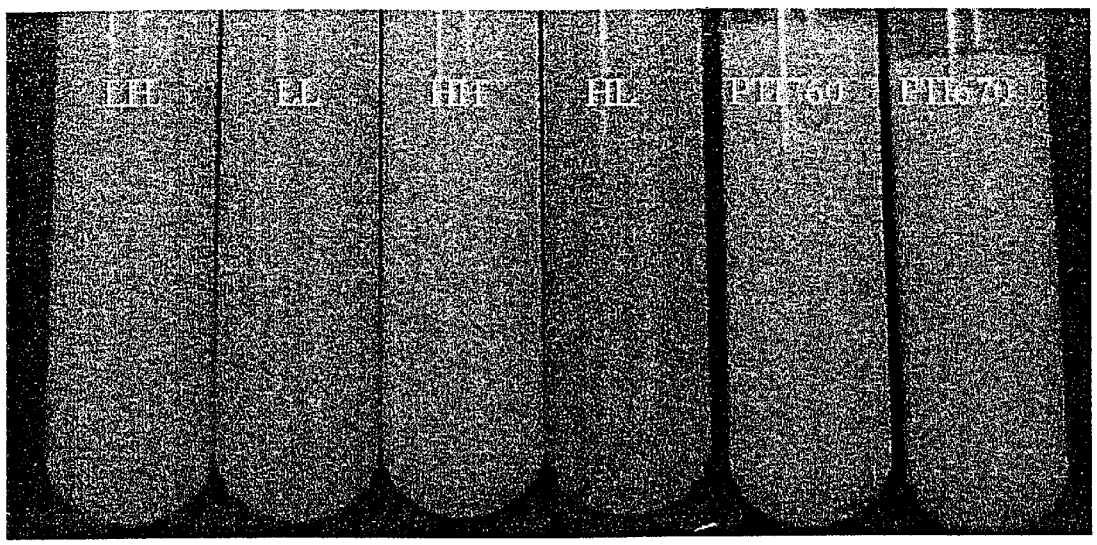
FIGS. 7A and 7B show photographs of test tubes containing suspensions of 5%(w/w) soy protein isolates in 5%(w/w) sucrose solutions immediately after settling for 16 hours (7B) and after subsequent remixing (7A). The following labeling scheme was used for the tubes—LL (Ex. 4), LH (Ex. 5), HL (Ex. 6), HH (Ex. 7), PT1760 (Supro™ 760) and PT1670 (Supro™ 670).
Figure 7B:
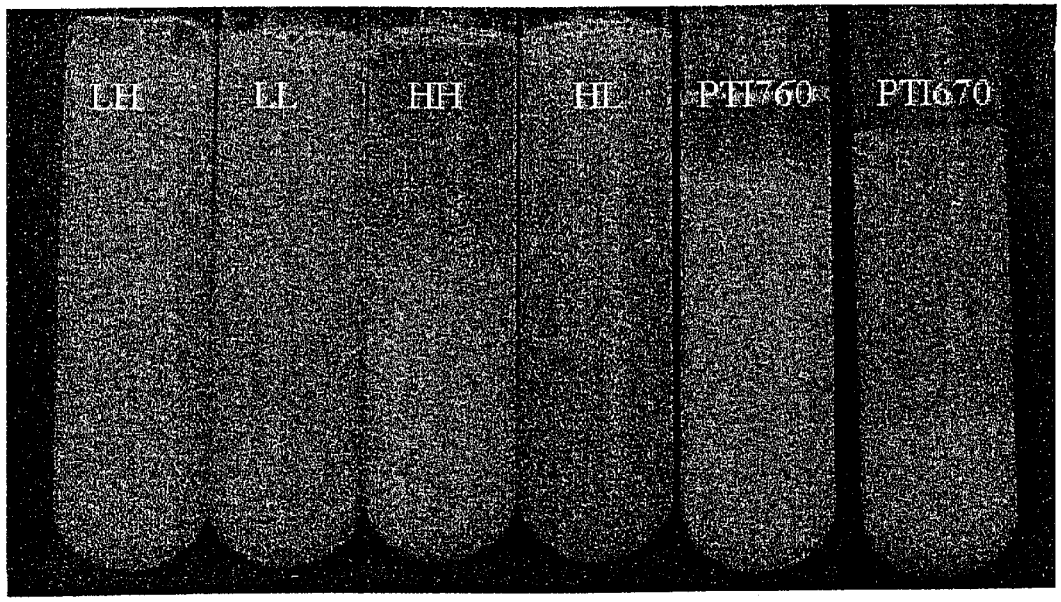

Slurries (5% (w/w)) were made up in the presence of 5% (w/w) sucrose in deionized water. The four prototypes were somewhat difficult to wet and had to be mixed with a homogenizer to get uniform slurries. This was not required for the two commercial products. The resulting slurries were allowed to stand for about 1 hour at room temperature, then aliquots were diluted 10-fold into water and the absorbance at 500 nm was measured. This absorbance measurement is influenced by turbidity and/or solubility; higher absorbance values indicated lower solubility. The results are shown in Table 9. The observations suggest that three of the prototypes were more prone to go into solution than to simply be suspended in the slurry. This could be an advantage in formulating beverage products where opacity is not desired. Photos were also taken of the slurries immediately after settling for 16 hours (FIGS. 7B) and after subsequent remixing (FIG. 7A). The three prototypes that showed the lowest absorbance in Table 9 also showed the least settling overnight. While it may not be apparent from the photos, the slurry derived from the Ex. 7 prototype had a distinctly brownish tint. It was clear from further observation that a lack of particulates tended to make the suspensions look darker. Upon settling, the upper portion of the slurries made with the commercial samples darkened. Shaking the slurries made them appear lighter again.

TABLE 9

Absorbance of Protein Isolate Slurries in Sucrose Solutions.

| Sample | Absorbance (500 nm) |
| --- | --- |
| Ex. 4 | 0.894 |
| Ex. 5 | 0.856 |
| Ex. 6 | 0.581 |
| Ex. 7 | 1.294 |
| Supro ™ 760 | 1.078 |
| Supro ™ 670 | 1.531 |

Samples of the prototypes were also formulated into an adult beverage. A high-soy protein beverage that would meet the new health claim requirements was targeted. The initial formulas were quite simple (see Table 10). Beverages formulated from the prototypes were compared to ones based on Supro™ 670 (from Protein Technology Inc.) and Profam™ 974 (from Archer Daniels Midland). These were the products recommended by the respective manufacturers for formulation of beverages of this type.

TABLE 10

Formulas for Flavored high-soy beverage mixes

| Ingredient | Vanilla-flavored | Chocolate-flavored |
| --- | --- | --- |
| Soy isolate | 38.2 | 32.21 |
| Sugar | 57.29 | 48.32 |
| Cocoa | — | 15.66 |
| Vanilla powder | 2.65 | 2.24 |
| Salt | 1.86 | 1.57 |
| TOTAL | 100.0 | 100.0 |

Sensory evaluation was performed on the prototype beverages and on comparable beverages made with the commercial products. Dry mix of chocolate (44.7 g) or vanilla (37.7) were added to 472 g water, mixed in a Waring blender for about 10 seconds to completely mix and evaluated on a scale from one (poor) to five (good). These levels of addition resulted in identical soy protein contents in the finished beverage (6.48 g per 8-ounce serving). Overall ratings of soy-based beverages containing prototype and commercial isolates are shown in Table 11. The ratings are the average of scores from 7 panelists. It was noted that the flavored beverages based on the prototypes of Examples 4–7 lacked any gritty mouthfeel and that settled less upon standing than the commercial products.

TABLE 11

Flavor Ratings of soy-based beverages

| Ingredient | Vanilla-flavored | Chocolate-flavored |
| --- | --- | --- |
| Profam ™ 974 | 2.19 | 2.64 |
| Supro ™ 670 | 2.03 | 2.41 |
| Ex. 4 | 2.09 | 3.08 |
| Ex. 5 | 3.01 | 3.43 |
| Ex. 6 | 3.03 | 3.54 |
| Ex. 7 | 2.54 | 2.26 |

EXAMPLE 13

Compositions of Soy Protein Isolates

Additional analyses of the compositions of the four prototypes described in Examples 4–7 were analyzed (protein, fat, fiber, moisture, ash). The results are shown in Table 12. The analyses were conducted using standard AOAC methods. Crude fiber followed method AOAC 962.09. Fat (by acid hydrolysis) followed method AOAC 922.06. Moisture and ash followed method AOAC 930.42/942.05. Protein (Kjeldahl using a 6.25 conversion factor) was conducted using method AOAC991.20.1.

One of the consequences of protein degradation by enzymes (or acid) is the release of alpha-amines. These amines react with ninhydrin and allow a way to measure the degree of hydrolysis. This method was applied to the commercial and prototype isolates with the results shown in Table 22. Though large differences between commercial isolates are evident, there is no systematic difference between the samples of Examples 4–7 and the commercial samples. Examples of soy protein products with high, medium or low concentrations of FAN were found.

TABLE 12

|  | Ex. 4 | Ex. 5 | Ex. 6 | Ex. 7 |
|---|---|---|---|---|
| Protein* | 81.40 | 83.06 | 81.17 | 79.69 |
| FAN (mg/g) | 1.09 | 0.57 | 2.06 | 0.40 |
| Fat** | 1.48 | 2.14 | 1.17 | 1.24 |
| Moisture | 8.45 | 5.86 | 8.45 | 8.09 |
| Ash | 5.97 | 5.65 | 6.18 | 6.51 |
| Fiber | 0.12 | 0.15 | 0.17 | 0.27 |

\* - Protein content determined by Kjeldahl Method.
\*\* - Fat content determined by acid hydrolysis

EXAMPLE 14

Molecular Weight Profiles of Soy Protein Isolates

Figure 8:
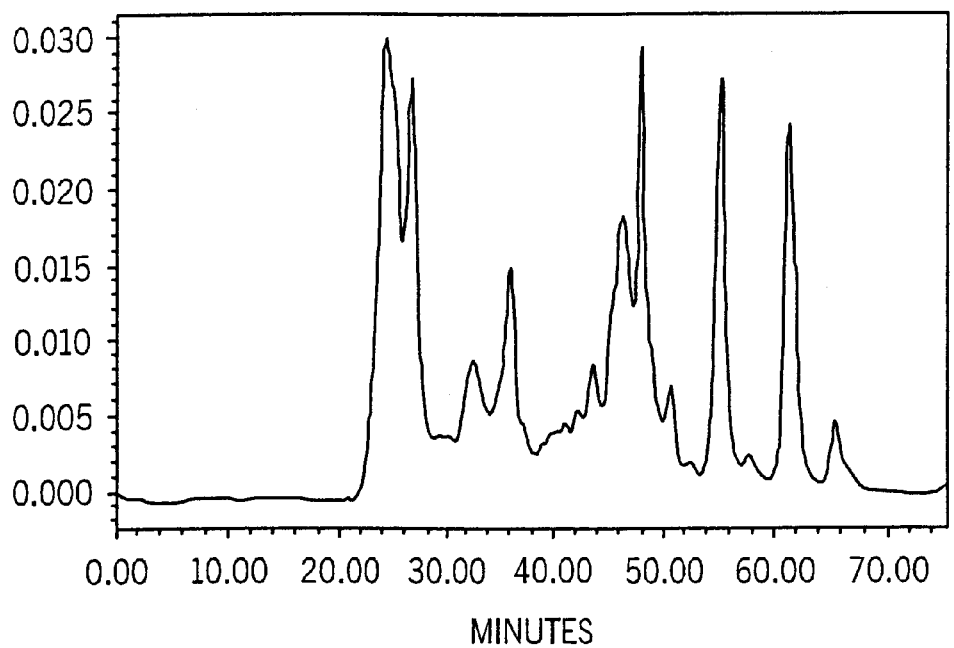
FIG. 8 depicts a HPLC trace showing the molecular weight profile of the pH 6.8 soluble material in a crude extract obtained from untoasted, defatted soy flakes (obtained by extraction of the soy flakes at pH 8.5).
Figure 9:
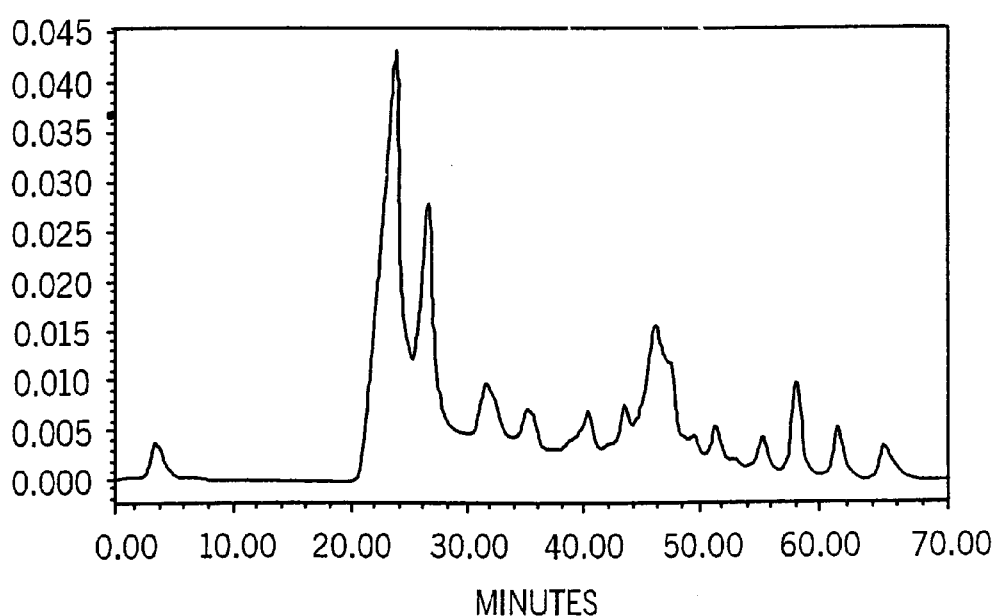
FIG. 9 depicts a HPLC trace showing the molecular weight profile of a soy protein product formed by the method described in Example 4.
Figure 10:
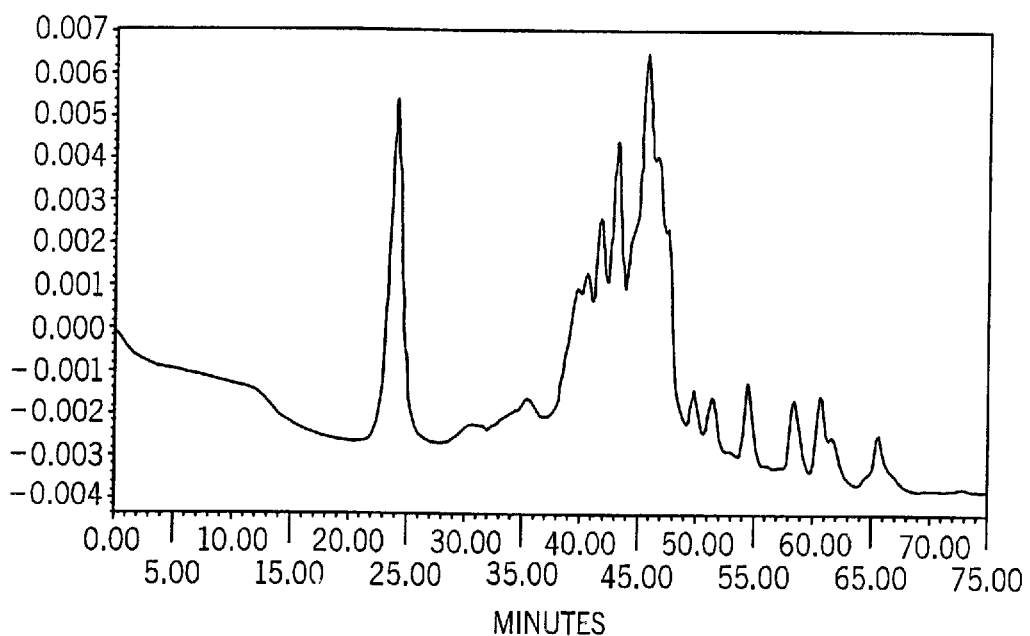
FIG. 10 depicts a HPLC trace showing the molecular weight profile of a soy protein product formed by the method described in Example 5.
Figure 11:
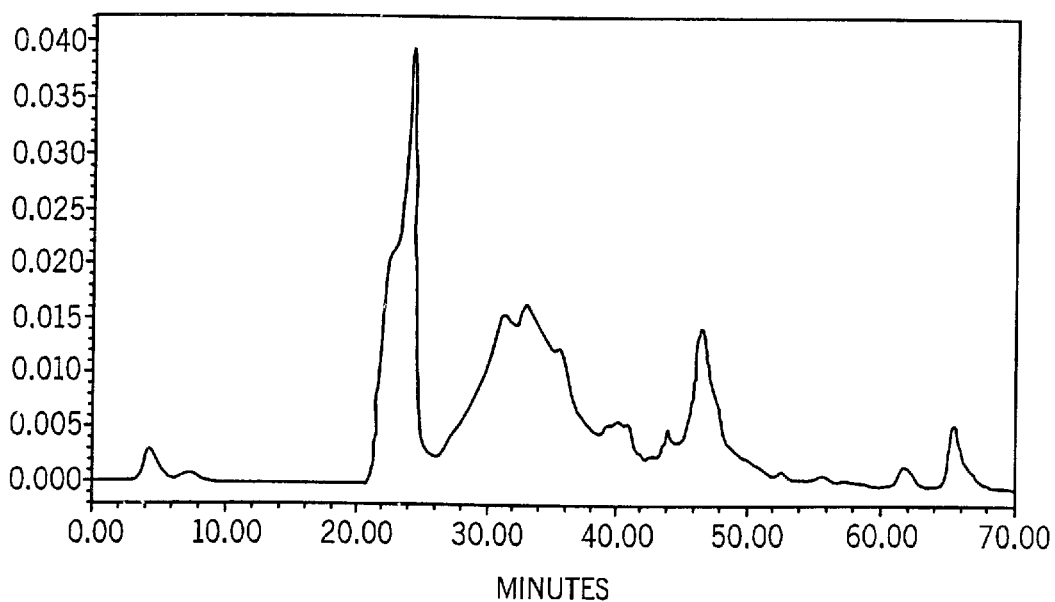
FIG. 11 depicts a HPLC trace showing the molecular weight profile of a soy protein product formed by the method described in Example 7.
Figure 12:
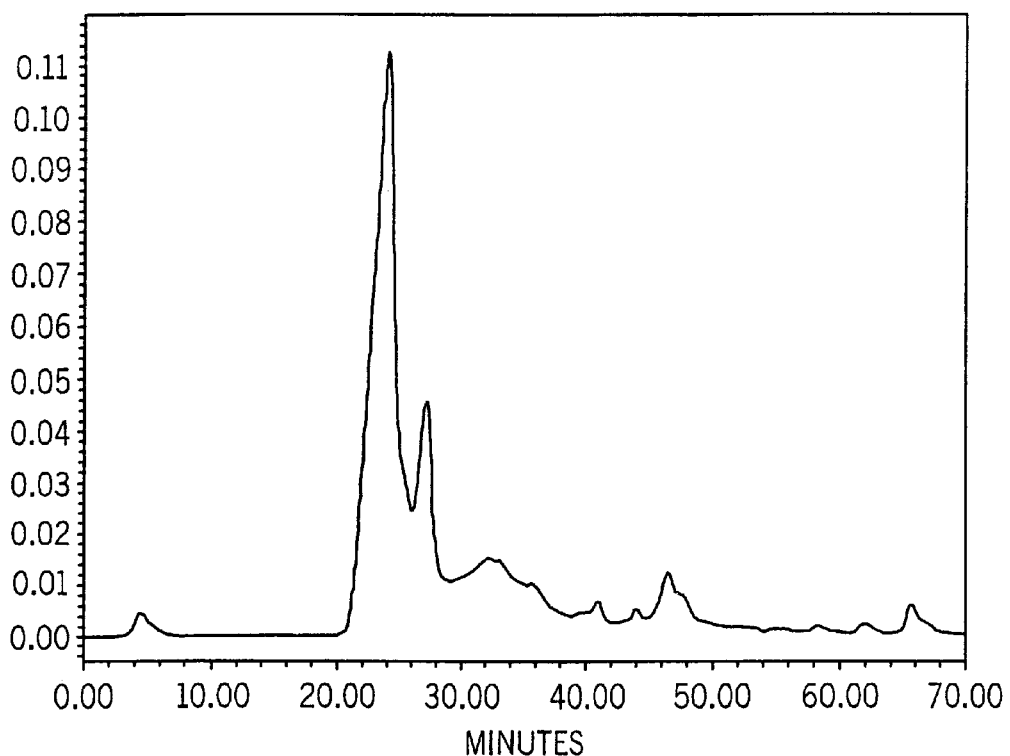
FIG. 12 depicts a HPLC trace showing the molecular weight profile of a soy protein product formed by the method described in Example 6.
Figure 13:
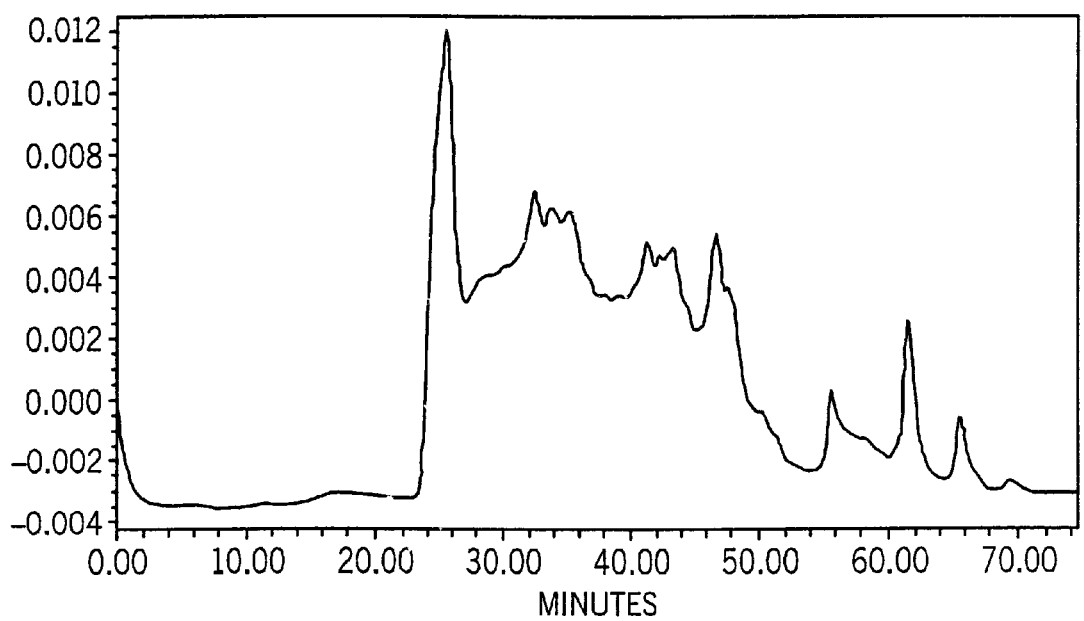
FIG. 13 depicts a HPLC trace showing the molecular weight profile of PTI Supro™ 670, a commercial soy protein isolate.
Figure 14:
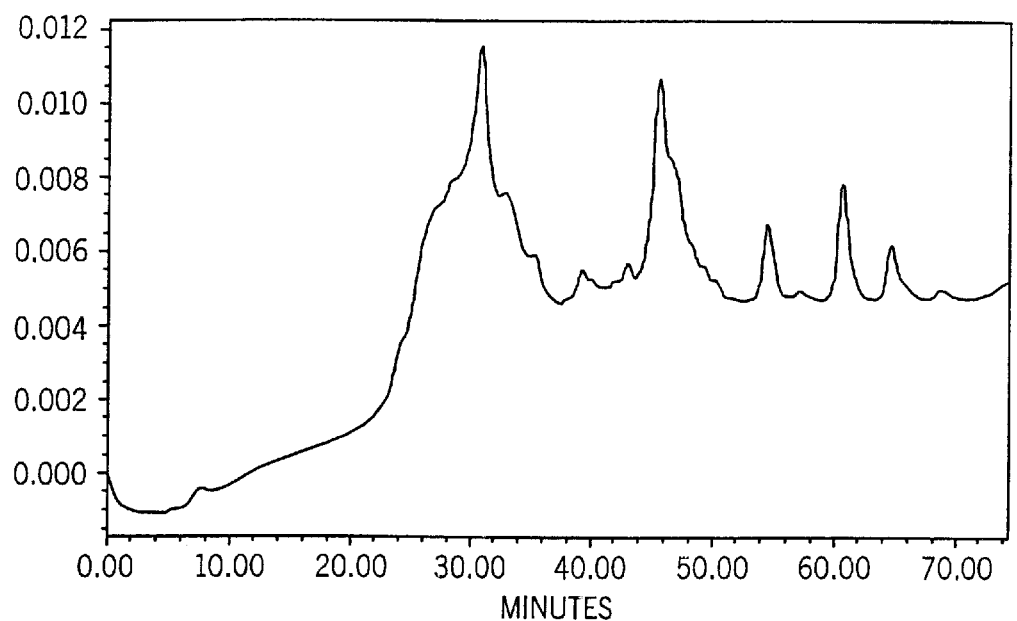
FIG. 14 depicts a HPLC trace showing the molecular weight profile of PTI Supro™ 760, a commercial soy protein isolate.
Figure 15:
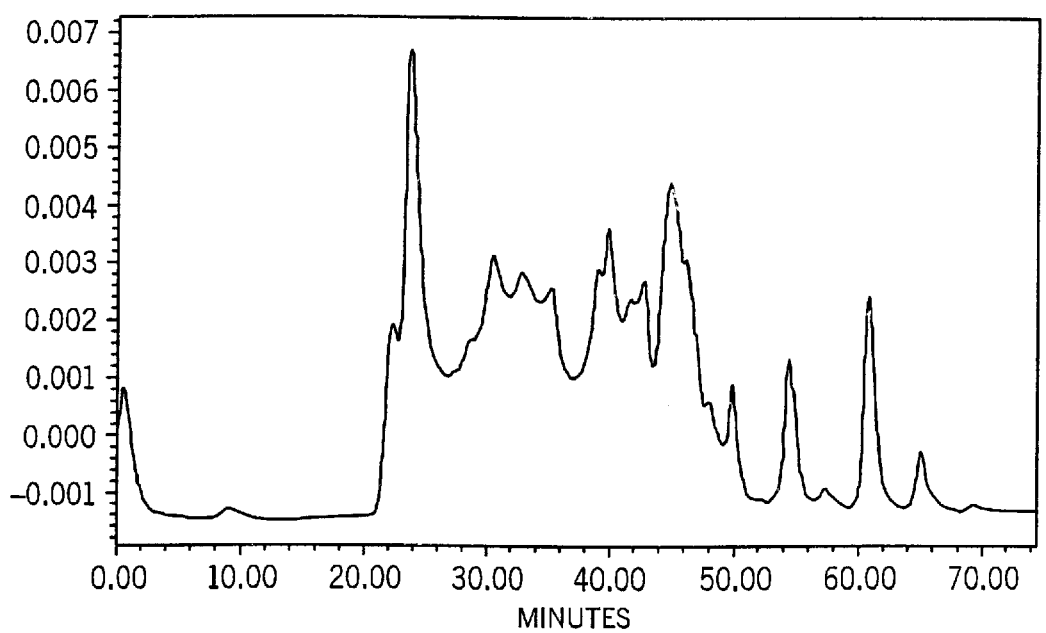
FIG. 15 depicts a HPLC trace showing the molecular weight profile of Profam™ 974, a commercial soy protein isolate.

One indicator of the amount of proteins still present in their native structure is their molecular weight profile. For pure proteins, chromatography usually reveals a single symmetric peak. Mixtures of proteins, as would exist in soy isolate, should generally consist of a series of symmetric peaks. This is illustrated in FIG. 8 is a chromatogram showing the molecular weight profile of an extract from untoasted, defatted soy flakes. If processing did not result in breaking up of the protein, a similar profile would be found for soy isolates.

Samples of soy protein products (25 mg) were suspended in 1 mL of 50 mM sodium phosphate-NaOH (pH 6.8). The samples were mixed vigorously (and occasionally sonicated) for a total of 20 minutes. The samples were centrifuged for 1 minute in a microfuge to settle the insolubles. Supernatant (100 $\mu$L) was dilated with solvent (900 $\mu$L), filtered through a 0.45 $\mu$m syringe filter and 100 $\mu$L of the filtered sample was injected onto the HPLC. The HPLC columns were a tandem set comprising Biorad SEC 125 and SEC 250 gel chromatography columns equilibrated with 50 mM sodium phosphate-NaOH (pH 6.8), 0.01% w/v sodium azide. Flow rate was set at 0.5 mL/min and the elution of proteins was monitored at 280 nm. In addition to the samples of the soy protein products, a sample of fresh, clarified extract (pH 8.5) of soy flakes was diluted in equilibration buffer and run to provide an untreated comparison.

The chromatograms for a number of samples of commercial soy protein isolates samples and the four soy protein products described in Examples 4–7 are shown in the FIGS. 9–15. In brief, the vast majority of commercial samples (not all shown) show signs of degradation, sometimes significant amounts of degradation. The prototype samples show substantially less evidence of degradation.

Degradation could be accidental or deliberate. Accidental degradation could arise from mechanical damage (e.g., high shear or cavitation mixing), acid or alkali hydrolysis during heating steps, or enzymatic hydrolysis at any time during processing. The enzymatic hydrolysis could be due to either protein degrading enzymes naturally present in the soy or enzymes secreted by contaminating bacteria. The proteins could also be intentionally degraded in order to improve the functional properties of the protein. Partial hydrolysis can improve emulsification or foaming properties of soy proteins. Extensive hydrolysis can improve solubility under acidic conditions.

EXAMPLE 15

DSC Scans of Soy Protein Isolates

Samples of soy protein products (50 mg) were weighed into a sample vial, mixed with 50 $\mu$L water and crimped shut. Samples were placed in a Perkin-Elmer DSC and heated at 10° C./min from about 30° C. to about 135° C.

Figure 16:
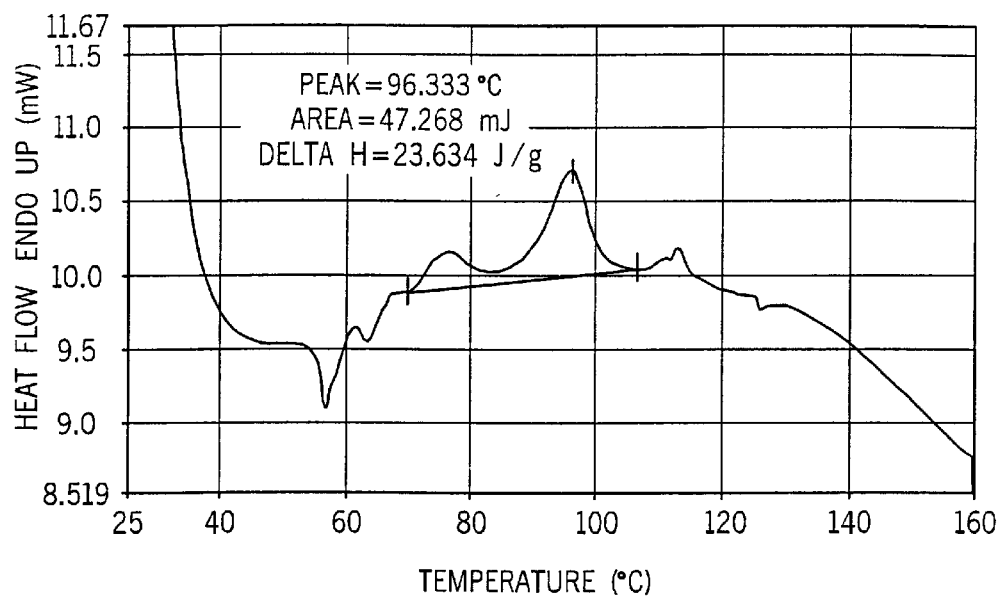
FIG. 16 shows a differential scanning calorimetry scan of a sample of a crude soy flake extract (obtained by extraction of the soy flakes at circa pH 7).

Calorimetry scans of the soy protein products of Examples 4–7 and a number of commercial soy protein samples are shown in FIGS. 17–23. In brief, native soy protein (as represented by a spray dried sample of a crude extract obtained from untoasted, defatted soy flakes) has a maximum energy absorption at about 93° C. with a side peak of absorption around 82° C. (see FIG. 16). The 93° C. peak apparently represents the 11S protein and the 82° C. peak the 7S protein (see, e.g., Sorgentini et al., *J. Ag. Food Chem.*, 43:2471–2479 (1995)). The data obtained from DSC scans of the protein products of Examples 4–7 as well as for Supro™ 670 are sumarized in Table 13. The soy protein products from Examples 4 and 6 showed large peak energy absorption at about 93° C. (see FIGS. 17 and 20). The soy protein products from Examples 5 and 7 showed smaller peak energy absorption at about 82° C. (see FIGS. 18–19). Commercial samples tended to show peaks only around 82° C. and a number of commercial samples show no signs of heat absorption at all, indicating that the protein in the sample was already completely denatured (see, e.g., data in Table 13 for Supro™ 670 and FIGS. 21–23). No commercial samples showed a peak at 93° C.

TABLE 13

DSC Analysis of Soy Protein Isolates

|  | Ex. 4 | Ex. 5 | Ex. 6 | Ex. 7 | Supro ™ 670 |
|---|---|---|---|---|---|
| Peak Energy Absorption | 94.28° C. | 82.68° C. | 92.21° C. | 82.5° C. | 82.53° C. |
| Energy of Absorption (J/g) | 9.24 | 0.98 | 8.30 | 1.39 | 1.37 |
| DSC Scan in FIG. # | 17 | 18 | 20 | 19 | 21 |

EXAMPLE 16

Conductivity/Salt Content of Soy Protein Isolates

Suspension (5% (w/v)—dsb) of samples of soy protein products were prepared in distilled deionized water. Each suspension was vigorously mixed without pH adjustment and left standing for 20–60 min at RT. The suspension was re-mixed and the conductivity measured. The pH was adjusted to 7.0 and the conductivity measured again.

Analyses for sodium, calcium and potassium content of samples were carried out using a modification of the EPA 6010B method. In brief, samples were refluxed in nitric acid, cooled, filtered and diluted for inductively coupled plasma spectroscopy-atomic emission spectroscopy. Two samples were analyzed in duplicate, spikes with standard samples were used to confirm complete recovery of ions and two samples with exceptionally high sodium contents were reconfirmed by additional analysis. All checks indicated that the results were reliable.

The modified soy protein materials produced by the present method generally have a relatively low amount of sodium ions. This is reflected in a low ratio of sodium ions as a percentage (on a weight basis) of the total of sodium, calcium and potassium ions. Typically, the ratio of sodium ions to the total of sodium, calcium and potassium ions is no more than about 0.5:1.0 (i.e., 50%) and, more desirably, no more than about 03:1.0 (i.e., 30%). In some instances, it may be possible to produce modified soy protein materials where the ratio of sodium ions to the total of sodium, calcium and potassium ions is no more than about 02:1.0 (i.e., 20%). The method allows the production of modified soy protein materials with levels of sodium ions of no more than about 7000 mg/kg (dsb). By employing deionized water in the extraction and/or diafiltration steps, it may possible to produce modified soy protein materials with even lower levels of sodium ions, e.g., Isodium ion levels of 5000 mg/kg (dsb) or below.

Soybeans contain relatively little sodium, but substantial quantities of potassium and calcium. A number of bases may be used in the processing of soy isolates that could end up as part of the finished product. While sodium hydroxide would be the most common choice, calcium and potassium hydroxides could also be employed. For example, calcium hydroxide might be used to attempt to produce a soy isolate more similar to milk protein. Because the process described in Examples 4–7 to manufacture the soy protein products has few pH changes and the final pH change is downward, there was a reasonable chance that lower levels of sodium- would be found, compared to products produced by commercial processes. This is confirmed by the results of the analysis, shown in Table 24.

The samples produced in Examples 4–7 have significantly lower sodium content and significantly higher potassium content than the samples of commercial soy isolates. With two exceptions, the calcium content of the samples from Examples 4–7 was much higher than the commercial samples. Most surprising is the extremely low potassium and calcium contents of several products (exemplified by Profam™ 974). This result suggests that some part of the process used to produce Profam™ 974 involved much more intensive washing of the protein stream than is typical for the bulk of products.

TABLE 24

| | Ex. 4 | Ex. 5 | Ex. 6 | Ex. 7 | Supro™ 760 | Profam™ 974 |
|---|---|---|---|---|---|---|
| Conductivity (Micromhos) | | | | | | |
| As is pH | 1850 | 1350 | 1850 | 2200 | 1000 | 1200 |
| pH 7 | 1850 | 1810 | 2020 | 4050 | 2850 | 1600 |
| Cation Content (mg/kg) | | | | | | |
| Na | 6700 | 4200 | 5700 | 5600 | 12000 | 13000 |
| Ca | 5000 | 4800 | 4500 | 5400 | 3900 | 390 |
| K | 12000 | 14000 | 14000 | 14000 | 1600 | 930 |
| Na/(Na + Ca + K) | 28.3% | 18.3% | 23.6% | 22.4% | 68.6% | 90.8% |

Throughout this application various publications are referenced. The disclosures of these publications in their entireties are hereby incorporated by reference into this application in order to more fully describe the state of the art to which this invention pertains.

The invention has been described with reference to various specific and illustrative embodiments and techniques. However, it should be understood that many variations and modifications may be made while remaining within the spirit and scope of the invention.

TABLE 4

Summary of Soy Isolate Process Conditions

SUMMARY OF PROCESS CONDITIONS FOR SOY ISOLATION TESTS

| | Run 3A | Run 3B | Run 3C | Run 3D | Run 3E | Run 3F | Run 3G | Run 3H |
|---|---|---|---|---|---|---|---|---|
| Extraction Conditions: | | | | | | | | |
| Batch Size, gr. white flakes | 754.4 | 132 (2) | 754.4 | 754.4 | 754.4 | 754.4 | 754.4 | 3017 |
| Water/Flake (W/F) Ratio | 8:1 | 8:1 | 8:1 | 8:1 | 8:1 | 8:1 | 8:1 | 8:1 |
| pH | 8.5 | 8.5 | 8.5 | 8.5 | 8.5 | 8.5 | 8.5 | 8.5 |
| Temperature (° F.) | 70 | 70 | 70 | 70 | 140 | 70 | 70 | 120 |
| Extraction Time, min. | 30 | 30 | 30 | 30 | 30 | 30 | 30 | 30 |
| Flake Washing: | | | | | | | | |
| No. of Washes | 1 | 1 | 1 | 1 | 1 | 1 | 1 | 1 |
| W/F Ratio | 2:1 | 2:1 | 2:1 | 2:1 | 2:1 | 2:1 | 2:1 | 2:1 |
| Water Temperature (° F.) | 68 | 68 | 68 | 68 | 140 | 68 | 68 | 120 |

TABLE 4-continued

Summary of Soy Isolate Process Conditions

SUMMARY OF PROCESS CONDITIONS FOR SOY ISOLATION TESTS

|  | Run 3A | Run 3B | Run 3C | Run 3D | Run 3E | Run 3F | Run 3G | Run 3H |
|---|---|---|---|---|---|---|---|---|
| Membrane Sep. Conditions: | | | | | | | | |
| Membrane Pore Size/MWCO | 1.2 micron | 1.2 micron | 1.2 micron | 500,000 | 1.2 micron | 500,000 | 500,000 | 500,000 |
| (Membrane Composition) | (PES) | (PES) | (PES) | (Mod. PAN) | (PES) | (Mod. PAN) | (Mod. PAN) | (Mod. PAN) |
| Concentration Ratio | 5 | 5 | 4.3 | 5 | 5 | 4 | 4.5 | 3.0 |
| Diafiltration Water (ml) | 1500 | 3000 | 1500 | 1500 | 1500 | 1500 | 1500 (2) | 4000 (2) |
| Feed Temperature (° F.) | 80 | 80 | 137 | 143 | 143 | 142 | 138 | 138 |
| Dryer Feed Conditions: | | | | | | | | |
| pH | 6.8 | NA | 6.8 | 6.8 | 6.8 | 6.8 | 6.8 | 6.8 |
| % d.s. | — | — | 12.7 | — | — | — | 12.6 | — |

TABLE 5

Summary of Soy Isolate Test Results

|  | Run 3A | Run 3B | Run 3C | Run 3D | Run 3E | Run 3F | Run 3G | Run 3H |
|---|---|---|---|---|---|---|---|---|
| Extraction Results: | | | | | | | | |
| Extraction Yields, % | 79.4 | 76.7 | 79.6 | 80.8 | 74.8 | 78.2 | 82.5 | 78.9 |
| Protein Solubilization, % | 92.0 | 93.4 | 92.8 | 92.5 | 88.2 | 91.3 | 93.7 | — |
| % Protein in Mixed Liquor, (dsb) | 64.0 | 63.1 | 65.1 | 66.4 | 65.3 | 65.2 | 65.0 | 64.9 |
| % Protein in Spent Flakes, (dsb) | 30.0 | 33.0 | 28.7 | 31.5 | 31.2 | 32.2 | 31.7 | 32.5 |
| Membrane Separation Results: | | | | | | | | |
| Membrane Efficiency* (%) | 94.1 | 94.5 | 92.9 | 94.1 | 91.3 | 92.8 | 93.5 | 93.8 |
| % Prot. in Ret. Before Diafilt. (dsb) | 85.6 | 88.8 | — | 84 | 86.4 | — | 83.2 | — |
| % Prot. In Ret. After Diafilt. (dsb) | 91.1 | 87.6 | 88.5 | 89.1 | 92.2 | 90.3 | 91.6 | 90.5, 87.4 |
| % Solids in Retentate | 17.6 | 10.43 | 15.6 | 14.11 | 14.9 | 11.8 | 19.07 | 15.6, 12.2 |
| Overall Process Yield** (before dryer), % | 33.6 | 35.3 | 36.1 | 40.0 | 31.3 | 33.3 | 40.7 | 39.1 |

*Membrane Efficiency is the total protein in the feed to the membrane, minus the total protein in the permeates, divided by the total protein in the feed to the membrane.
**Overall Process Yield is defined as the amount of protein solids in the dryer feed, adjusted for protein content of isolate (90%) and moisture content (4%), divided by the amount of starting white flakes.

What is claimed is:

1. A method for producing an oilseed protein product comprising:
   extracting oilseed material with an aqueous solution to form a suspension of particulate matter in an oilseed extract;
   passing the extract through a filtration system including a microporous membrane to produce a first permeate and a protein-enriched retentate, wherein the microporous membrane has an MWCO of at least 25,000 and a filtering surface with a contact angle of no more than 30 degrees;
   diafiltering the protein-enriched retentate through the filtration system to produce a diafiltration rententate and a diafiltration permeate, wherein the diafiltration retentate includes protein-enriched dissolved solids;
   combining the first permeate and the diafiltration permeate to form a combined permeate; and
   separating the combined permeate with a reverse osmosis membrane into an RO retentate and an RO permeate.

2. The method of claim 1 wherein diafiltering the protein-enriched retentate comprises diluting the protein-enriched retenetate with an aqueous diluent which includes the RO permeate.

3. The method of claim 1 further comprising recirculating the RO permeate into the aqueous solution for extracting the oilseed material.

4. The method of claim 1 wherein extracting the oilseed material comprises contacting the oilseed material with an aqueous alkaline solution.

5. The method of claim 4 wherein the aqueous alkaline solution has a pH of 7.5 to 10.0.

6. The method of claim 4 wherein the aqueous alkaline solution has a pH of 7.0 to 9.5.

7. The method of claim 1 wherein passing the extract through the filtration system comprises first passing an original volume of the extract through the filtration system while adding water to the extract so as to substantially maintain the original volume, and second passing the extract through the filtration system while allowing the retentate to be concentrated by a factor of at least 2.5 relative to the original volume.

8. The method of claim 1 wherein passing the extract through the filtration system comprises passing the extract through the filtration system to form a protein-enriched retentate which includes at least 10 wt. % protein.

9. The method of claim 1 comprising passing the extract through the filtration system under a transmembrane pressure of no more than 50 psig.

10. The method of claim 1 wherein the membrane is a modified polyacrylonitrile membrane.

11. The method of claim 1 wherein the diafiltration retentate includes at least about 70 wt % (dsb) protein.

12. The method of claim 1 wherein the diafiltration retentate includes at least about 90 wt % (dsb) protein.

13. A method for producing a modified oilseed material comprising:

extracting oilseed material with an aqueous alkaline solution at 20° C. to 60° C. to form a mixture of particulate matter in an extract solution;

removing at least a portion of the particulate matter from the mixture to form a clarified extract having a dissolved solids content of at least 5 wt. %; and passing the clarified extract at 55° C. to 60° C. through a filtration system including a microporous modified polyacrylonitrile membrane to produce a permeate and a protein-enriched retentate, wherein the microporous modified polyacrylonitrile membrane has an MWCO of 25,000 to 500,000 and a filtering surface with a contact angle of no more than 30 degrees.

14. The method of claim 13 comprising extracting the oilseed material with the aqueous solution at 20° C. to 60° C. for about 1–2 hours.

15. The method of claim 13 comprising passing the extract through the filtration system under a transmembrane pressure of no more than 50 psig.

16. The method of claim 13 comprising passing the extract through the filtration system under a transmembrane pressure of about 10–20 psig.

17. The method of claim 13 wherein passing the clarified extract through the filtration system comprises passing the clarified extract through the filtration system to form a protein-enriched retentate which includes at least 10 wt. % protein.

18. The method of claim 13 further comprising diafiltering the protein-enriched retentate through the filtration system to produce a protein-enriched diafiltration retentate and a diafiltration permeate; and combining the first permeate and the diafiltration permeate to form a combined permeate; and separating the combined permeate with a reverse osmosis membrane into an RO retentate and an RO permeate.

19. The method of claim 13 wherein the membrane has a filtering surface with a contact angle of no more than 15 degrees.

20. The method of claim 13 wherein the aqueous alkaline solution has a pH of 7.5 to 10.0.

21. The method of claim 13 wherein passing the extract through the filtration system comprises first passing an original volume of the extract through the filtration system while adding water to the extract so as to substantially maintain the original volume, and second passing the extract through the filtration system while allowing the retentate to be concentrated by a factor of at least 2.5 relative to the original volume.

22. The method of claim 13 wherein passing the extract through the filtration system comprises first passing the extract through a filtratration system to form a concentrated retentate which includes at least 10 wt. % protein; and passing the concentrated retentate through the filtration system while adding water to the concentrated retentate so as to substantially maintain the volume of the retentate to form the protein-enriched retentate.

23. The method of claim 13 wherein the protein-enriched retentate includes at least about 70 wt % (dsb) protein.

24. The method of claim 13 wherein the protein-enriched retentate includes at least about 90 wt % (dsb) protein.

25. The method of claim 13 wherein extracting the oilseed material is carried out by contacting 1 part by weight of the oilseed material with no more than about 10 parts by weight of the aqueous alkaline solution.

* * * * *

UNITED STATES PATENT AND TRADEMARK OFFICE
CERTIFICATE OF CORRECTION

PATENT NO.   : 6,630,195 B1
DATED        : October 7, 2003
INVENTOR(S)  : Harapanahalli S. Muralidhara et al.

It is certified that error appears in the above-identified patent and that said Letters Patent is hereby corrected as shown below:

Column 36,
Line 19, please replace "filtratration" with -- filtration --.

Signed and Sealed this

Sixth Day of July, 2004

JON W. DUDAS
*Acting Director of the United States Patent and Trademark Office*

UNITED STATES PATENT AND TRADEMARK OFFICE
CERTIFICATE OF CORRECTION

PATENT NO.    : 6,630,195 B1  
DATED         : October 7, 2003  
INVENTOR(S)   : Harapanahalli S. Muralidhara et al.

It is certified that error appears in the above-identified patent and that said Letters Patent is hereby corrected as shown below:

Column 18,  
Line 54, after "pH" delete "if";

Column 20,  
Line 51, after "membrane" delete "25";  
Line 63, after "above" delete "141IF" and substitute -- 141º F . --;

Column 22,  
Line 19, before "minutes" insert -- 30 --; and

Column 31,  
Table 4, Batch Size, gr. White flakes row, second column, Run 3B, delete "132" and substitute -- 1132 --.

Signed and Sealed this

Twenty-fifth Day of January, 2005

JON W. DUDAS  
*Director of the United States Patent and Trademark Office*